(12) United States Patent
Sato

(10) Patent No.: US 10,798,763 B2
(45) Date of Patent: *Oct. 6, 2020

(54) WIRELESS COMMUNICATION APPARATUS, INFORMATION PROCESSING APPARATUS, COMMUNICATION SYSTEM, AND COMMUNICATION METHOD

(71) Applicant: SONY CORPORATION, Tokyo (JP)

(72) Inventor: Masanori Sato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/825,274

(22) Filed: Nov. 29, 2017

(65) Prior Publication Data

US 2018/0084595 A1 Mar. 22, 2018

Related U.S. Application Data

(63) Continuation of application No. 14/119,019, filed as application No. PCT/JP2012/003303 on May 21, 2012.

(30) Foreign Application Priority Data

Jun. 3, 2011 (JP) ................ 2011-124997

(51) Int. Cl.
*H04W 72/00* (2009.01)
*H04W 76/14* (2018.01)
(Continued)

(52) U.S. Cl.
CPC ........... *H04W 76/14* (2018.02); *H04L 63/105* (2013.01); *H04M 1/2757* (2020.01); *H04W 4/70* (2018.02); *H04W 12/08* (2013.01); *H04W 76/10* (2018.02)

(58) Field of Classification Search
CPC ....... H04W 4/70; H04W 12/08; H04W 12/06; H04W 48/16; H04W 4/50; H04W 56/001; H04W 84/18; H04W 56/00; H04L 63/105
See application file for complete search history.

(56) References Cited

U.S. PATENT DOCUMENTS 6,704,571 B1 3/2004 Moon
8,285,206 B2 10/2012 Martin et al.
(Continued)

FOREIGN PATENT DOCUMENTS

CN 4802841 A 7/2006
CN 101022612 A 8/2007
(Continued)

OTHER PUBLICATIONS

Notice of Allowance and Fees Due for U.S. Appl. No. 14/119,019, dated Sep. 15, 2017, 10 pages.
(Continued)

*Primary Examiner* — Khalid W Shaheed
(74) *Attorney, Agent, or Firm* — Chip Law Group

(57) ABSTRACT

A communications apparatus and method provide logic for establishing communications sessions in accordance with one or more connection rights. In one implementation, a communications apparatus may include a control circuit configured to establish, through an information processing apparatus, a communications session with an additional communications apparatus associated with one or more first connection rights. The established communications session may be associated with one or more second connection rights that differ from the first connection rights, and the control circuit may be further configured to generate an instruction to transmit data in accordance with the second connection rights.

12 Claims, 26 Drawing Sheets

(51) Int. Cl.
  *H04L 29/06* (2006.01)
  *H04W 12/08* (2009.01)
  *H04W 4/70* (2018.01)
  *H04W 76/10* (2018.01)
  *H04M 1/2757* (2020.01)

(56) References Cited

U.S. PATENT DOCUMENTS

| | | |
|---|---|---|
| 8,489,072 B1 | 7/2013 | Ding |
| 9,351,143 B2 | 5/2016 | Barany et al. |
| 2005/0148321 A1 | 7/2005 | Igarashi et al. |
| 2005/0198193 A1 | 9/2005 | Halme |
| 2006/0261452 A1 | 11/2006 | Berchtold et al. |
| 2007/0087768 A1 | 4/2007 | Schmidt et al. |
| 2007/0116248 A1 | 5/2007 | Samama |
| 2008/0009277 A1* | 1/2008 | Bidwell ............... H04M 3/42 455/418 |
| 2008/0261562 A1 | 8/2008 | Jwa et al. |
| 2010/0261452 A1 | 10/2010 | Umezawa et al. |
| 2010/0330962 A1 | 12/2010 | Han et al. |
| 2011/0066856 A1 | 3/2011 | Yao et al. |
| 2012/0108207 A1 | 5/2012 | Schell et al. |

FOREIGN PATENT DOCUMENTS

| | | |
|---|---|---|
| EP | 1519531 A2 | 3/2005 |
| EP | 1636975 A1 | 3/2006 |
| JP | 2003-078617 A | 3/2003 |
| JP | 2003-179648 A | 6/2003 |
| JP | 2007-516629 A | 6/2007 |
| JP | 4159548 B2 | 10/2008 |
| JP | 2011-509575 A | 3/2011 |
| KR | 10-2006-0020685 A | 3/2006 |
| WO | 2004/045173 A1 | 5/2004 |
| WO | 2004/114640 A1 | 12/2004 |
| WO | 2010/069968 A1 | 6/2010 |

OTHER PUBLICATIONS

Advisory Action for U.S. Appl. No. 14/119,019, dated Feb. 8, 2017, 03 pages.
Final Office Action for U.S. Appl. No. 14/119,019, dated May 8, 2017, 19 pages.
Non-Final Office Action for U.S. Appl. No. 14/119,019, dated Oct. 25, 2016, 18 pages.
Non-Final Office Action for U.S. Appl. No. 14/119,019, dated Apr. 22, 2016, 16 pages.
Final Office Action for U.S. Appl. No. 14/119,019, dated Sep. 9, 2015, 16 pages.
Non-Final Office Action for U.S. Appl. No. 14/119,019, dated Mar. 4, 2015, 15 pages.
Office Action for CN Patent Application No. 201280026180.X, dated Jun. 22, 2017, 08 pages of Office Action and 10 pages of English Translation.
Office Action for CN Patent Application No. 201280026180.X, dated Dec. 16, 2016, 10 pages of Office Actio and 09 pages of English Translation.
Extended European Search Report of EP Patent Application No. 12793363.8, dated Oct. 21, 2015.
Office Action for JP Patent Application No. 2011-124997, dated Mar. 17, 2015.
"3rd Generation Partnership Project; Technical Specification Group Services and System Aspects; Feasibility study on the security aspects of remote provisioning and change of subscription for Machine to Machine (M2M) equipment", 3GPP TR 33.812 V9.2.0 (Jun. 2010) Technical Report (Release 9), Jun. 2010.
Michiko Nagai, "Do You Use Linus or Bill?—Grass-Roots Wireless LAN "FON" Has Been Started Also in Japan", [online], Japan, CNET Japan, Internet <URL: http://japan.cnet.com/news/commentary/20102387/>, Apr. 25, 2006.
International Preliminary Report on Patentability of PCT Application No. PCT/JP2012/003303, dated Dec. 9, 2013, 07 pages of IPRP.
International Search Report and Written Opinion of PCT Application No. PCT/JP2012/003303, dated Jun. 19, 2012, 08 pages of ISRWO.

* cited by examiner

[Fig. 1]
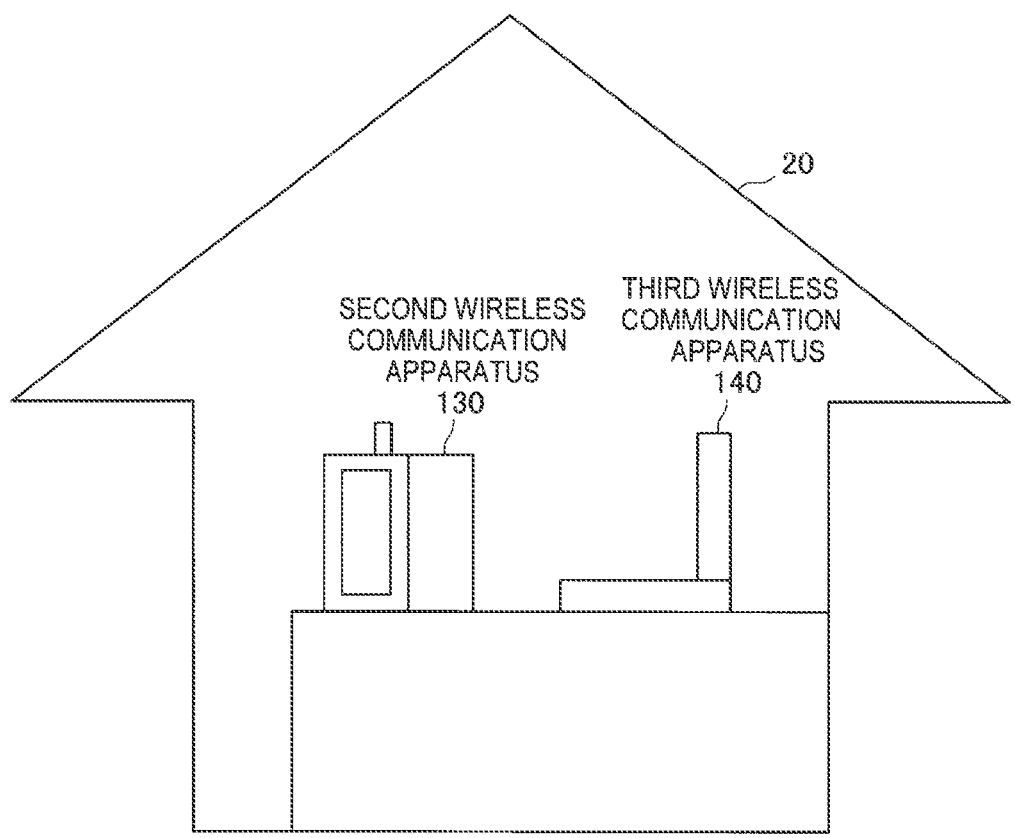
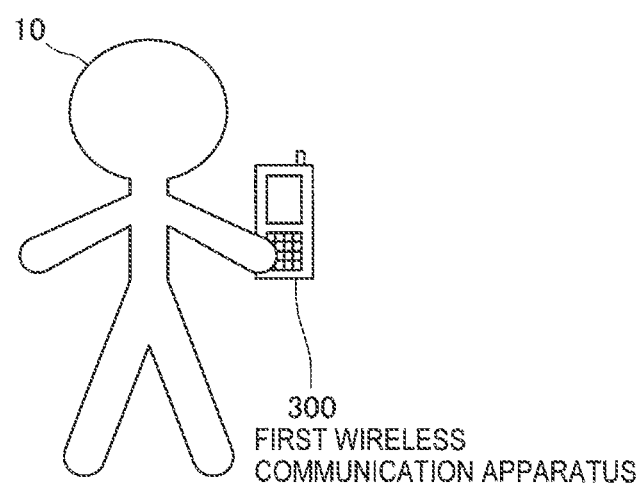

[Fig. 2]
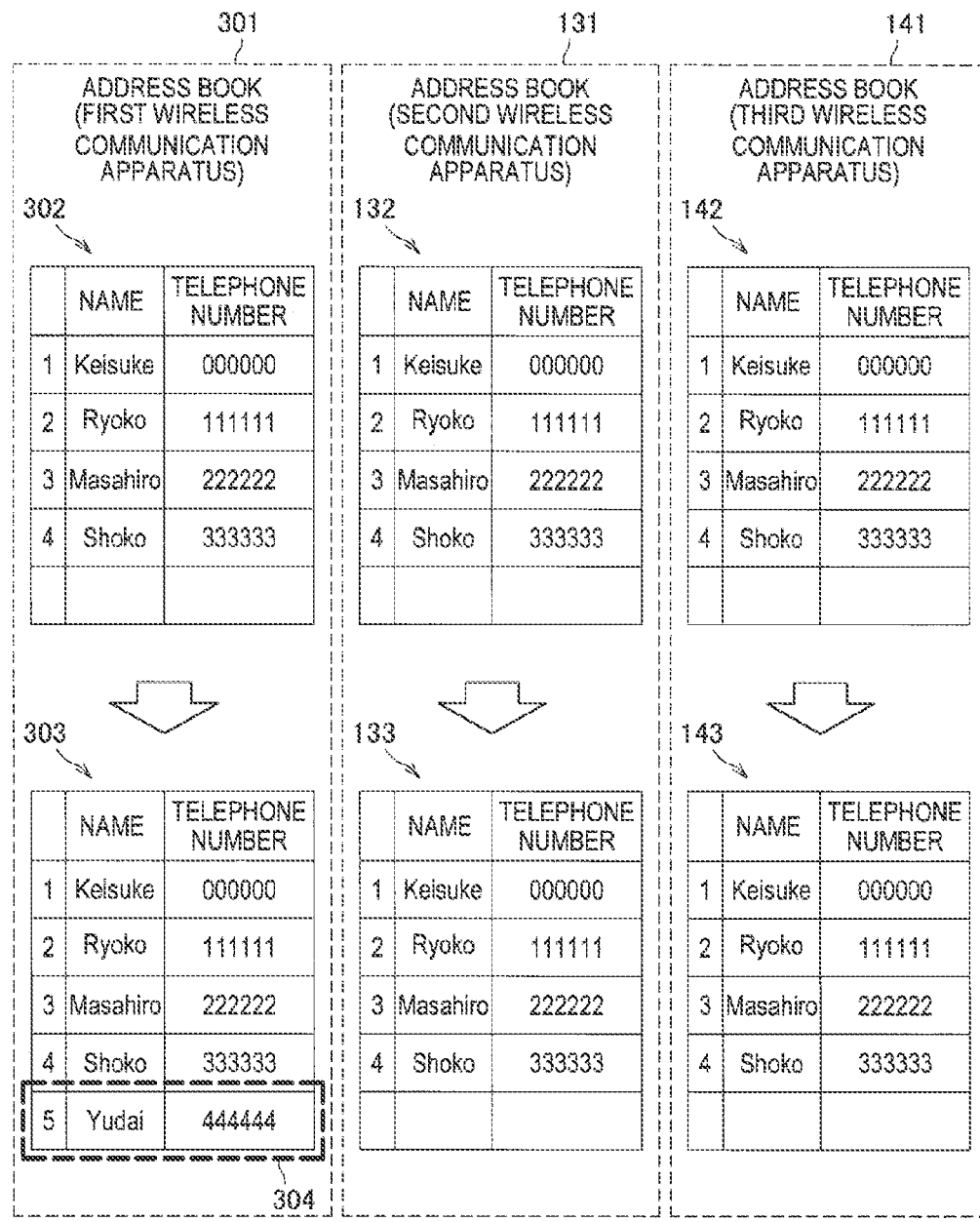

[Fig. 3]
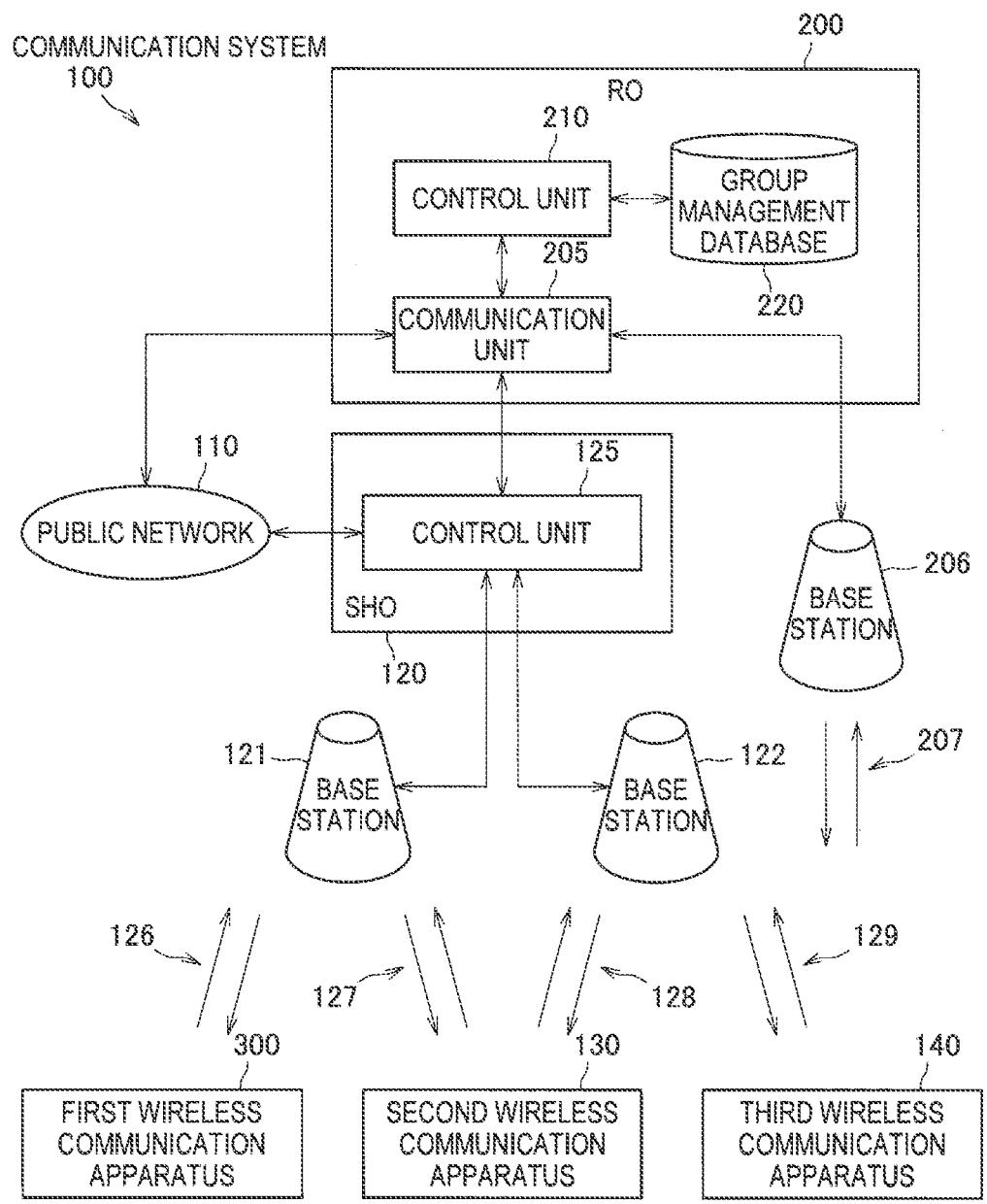

[Fig. 4]

| | GROUP NAME 221 | GROUP ID 222 | GROUP PASSWORD 223 | DEVICE NAME 224 | TERMINAL IDENTIFICATION INFORMATION 225 | VALID/INVALID INFORMATION 226 |
|---|---|---|---|---|---|---|
| 1 | GROUP AB | 123456789 | poiuytr | MY MOBILE | PCID#1 | VALID |
| | | | | MY E-BOOK READER | PCID#2 | INVALID |
| | | | | MY COMPUTER | PCID#3 | INVALID |
| 2 | ... | ... | ... | ... | ... | ... |
| ... | . | . | . | . | . | . |
| M | . | . | . | . | . | . |

GROUP MANAGEMENT DATABASE 220

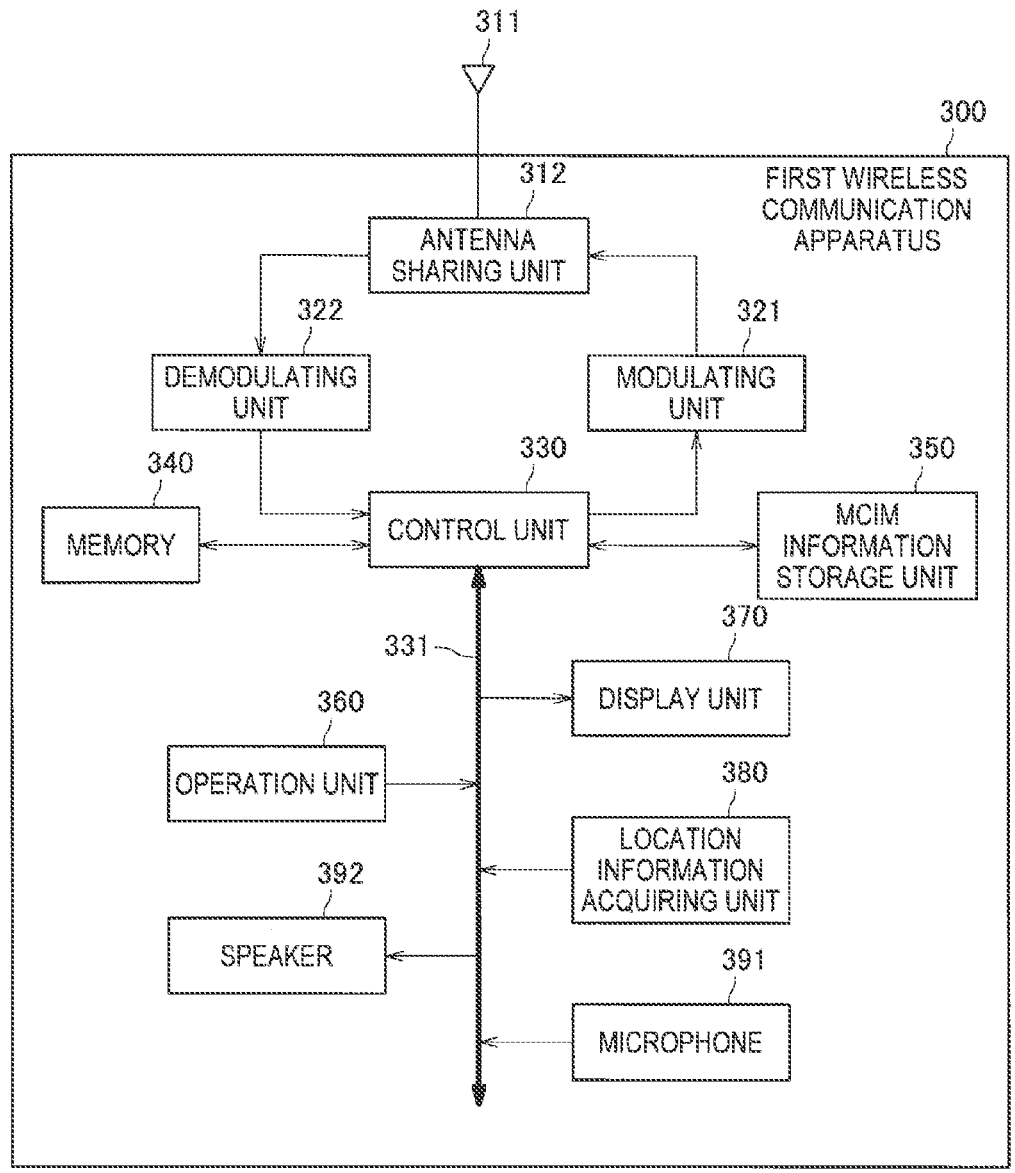
[Fig. 5]

[Fig. 6]
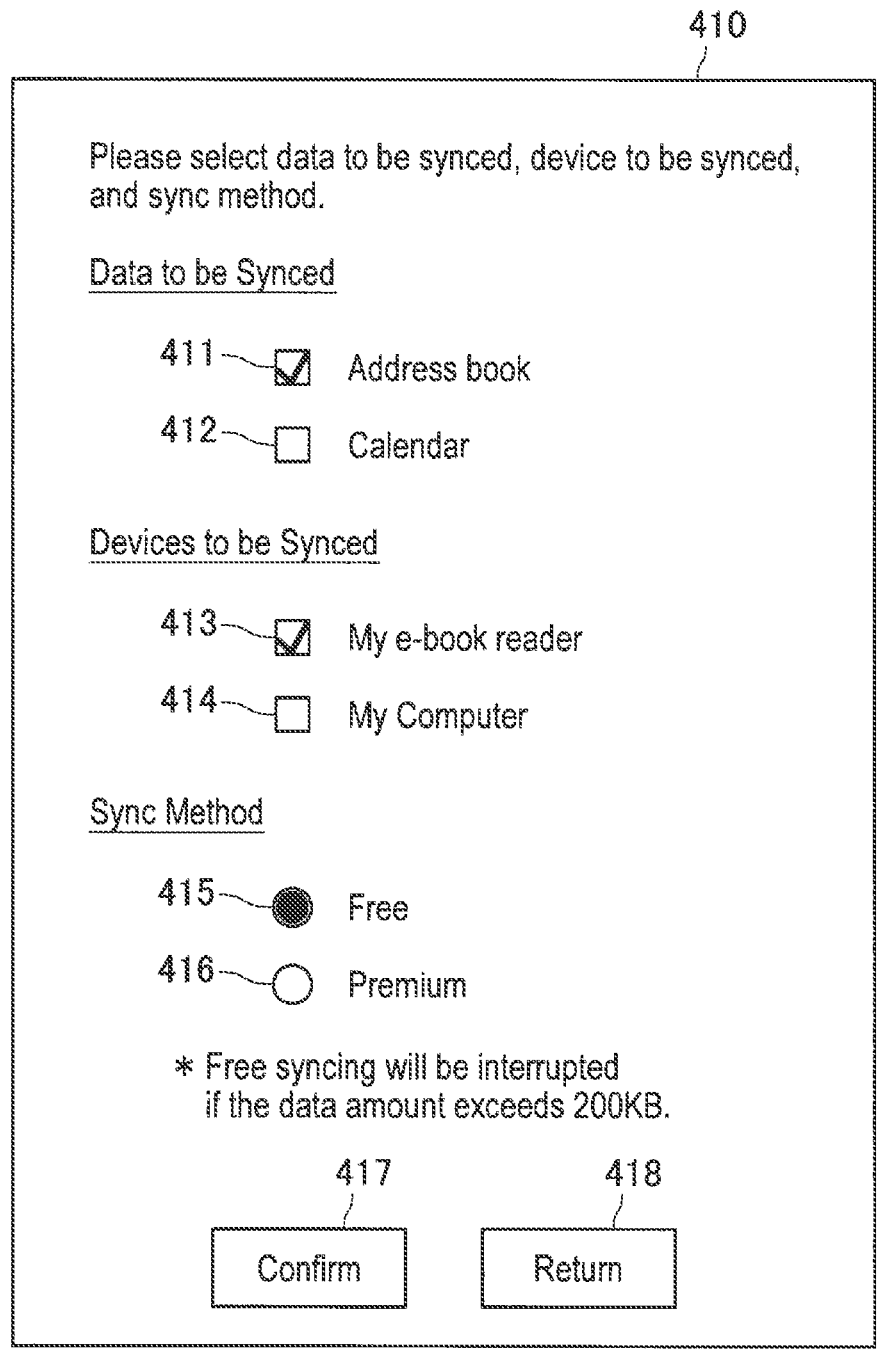

[Fig. 7]
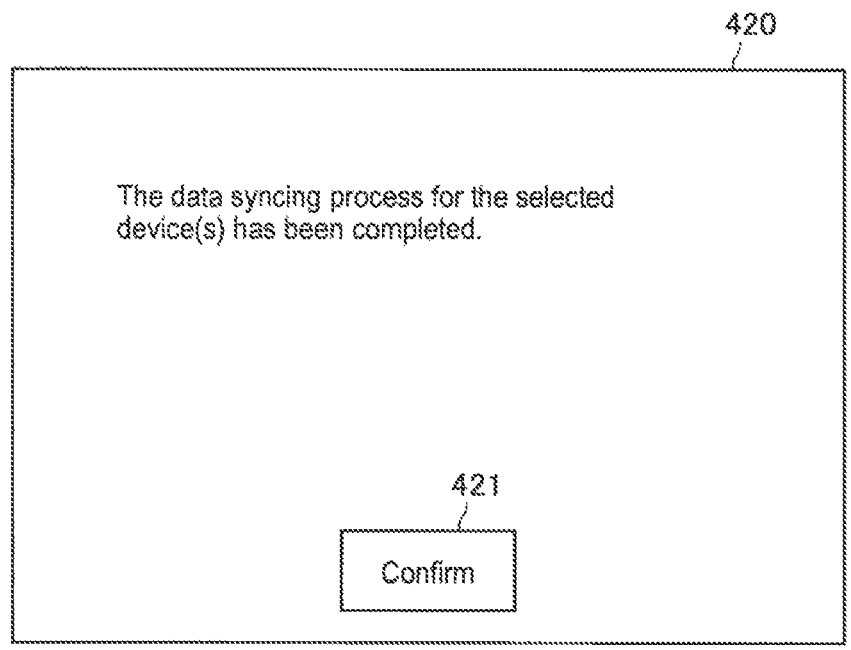
[FIG. 7(a)]
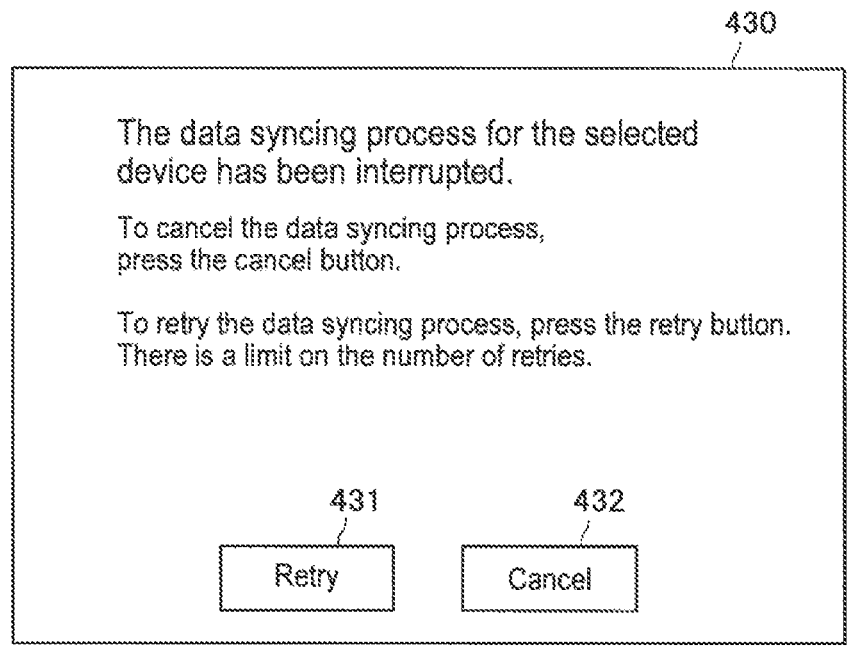
[FIG. 7(b)]

[Fig. 8]
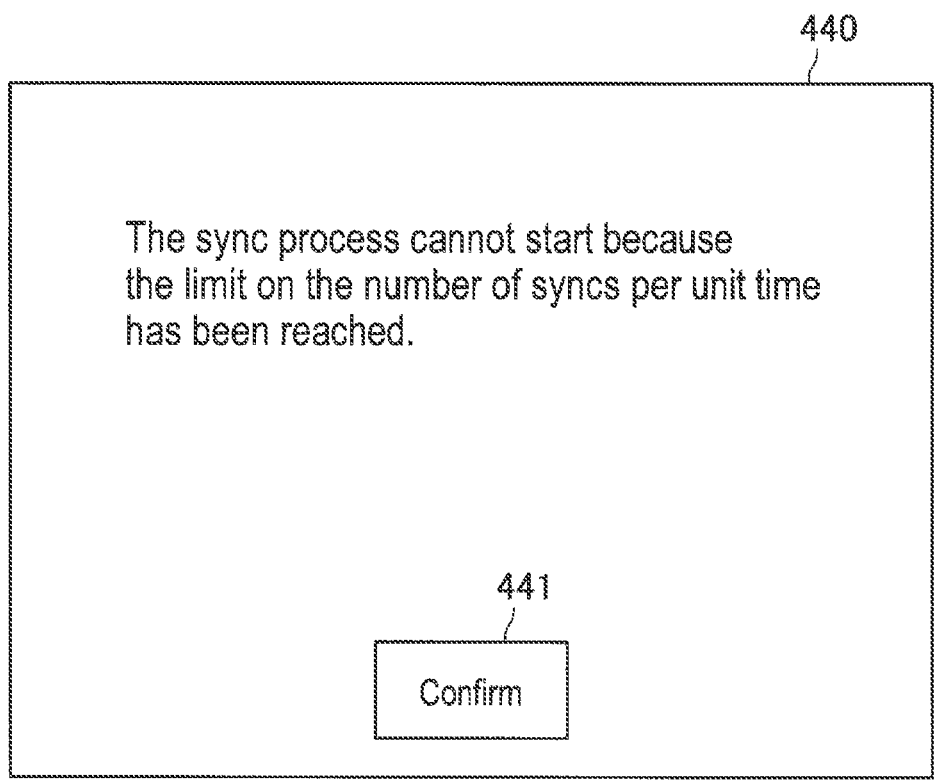

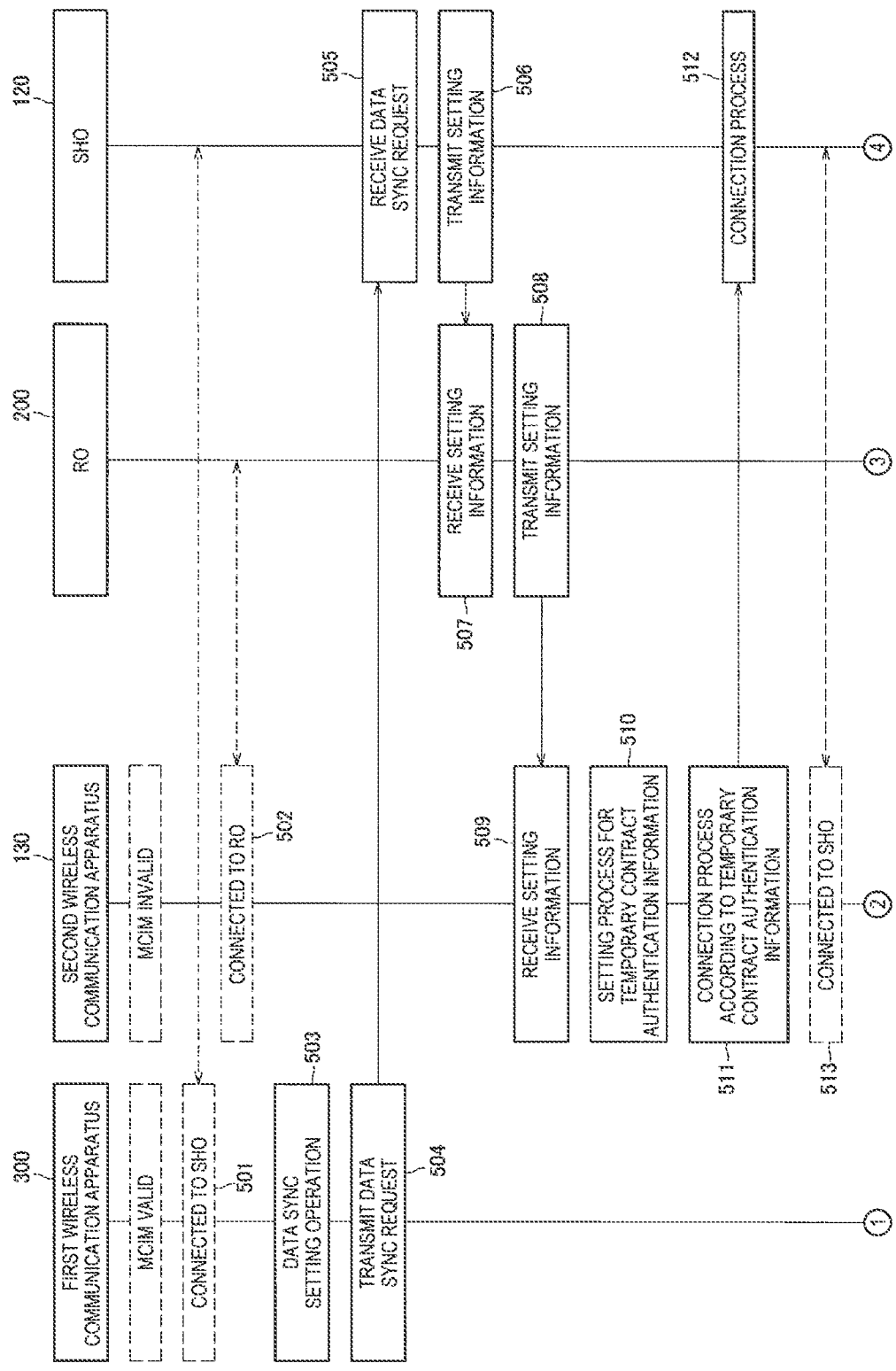

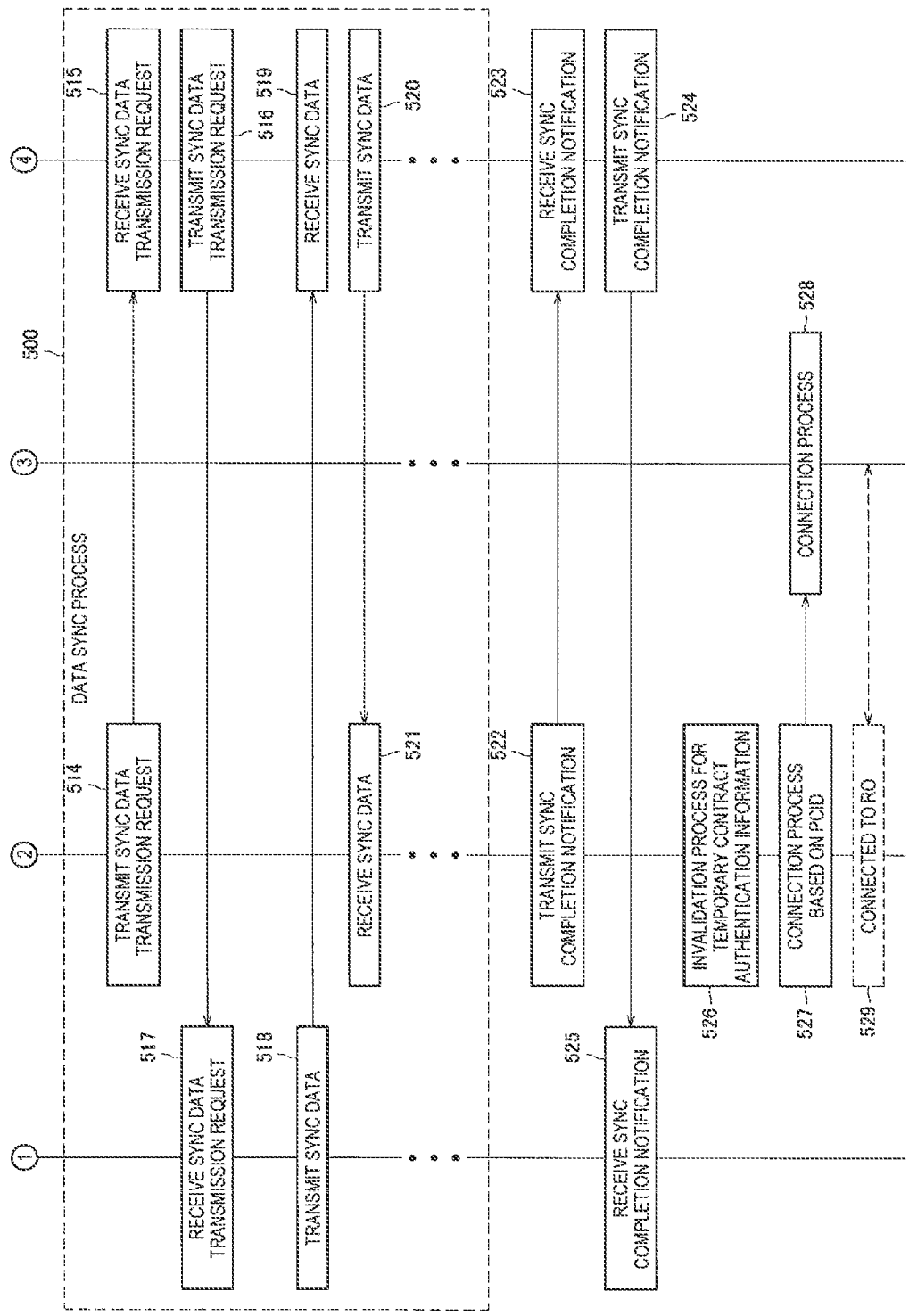

[Fig. 11]
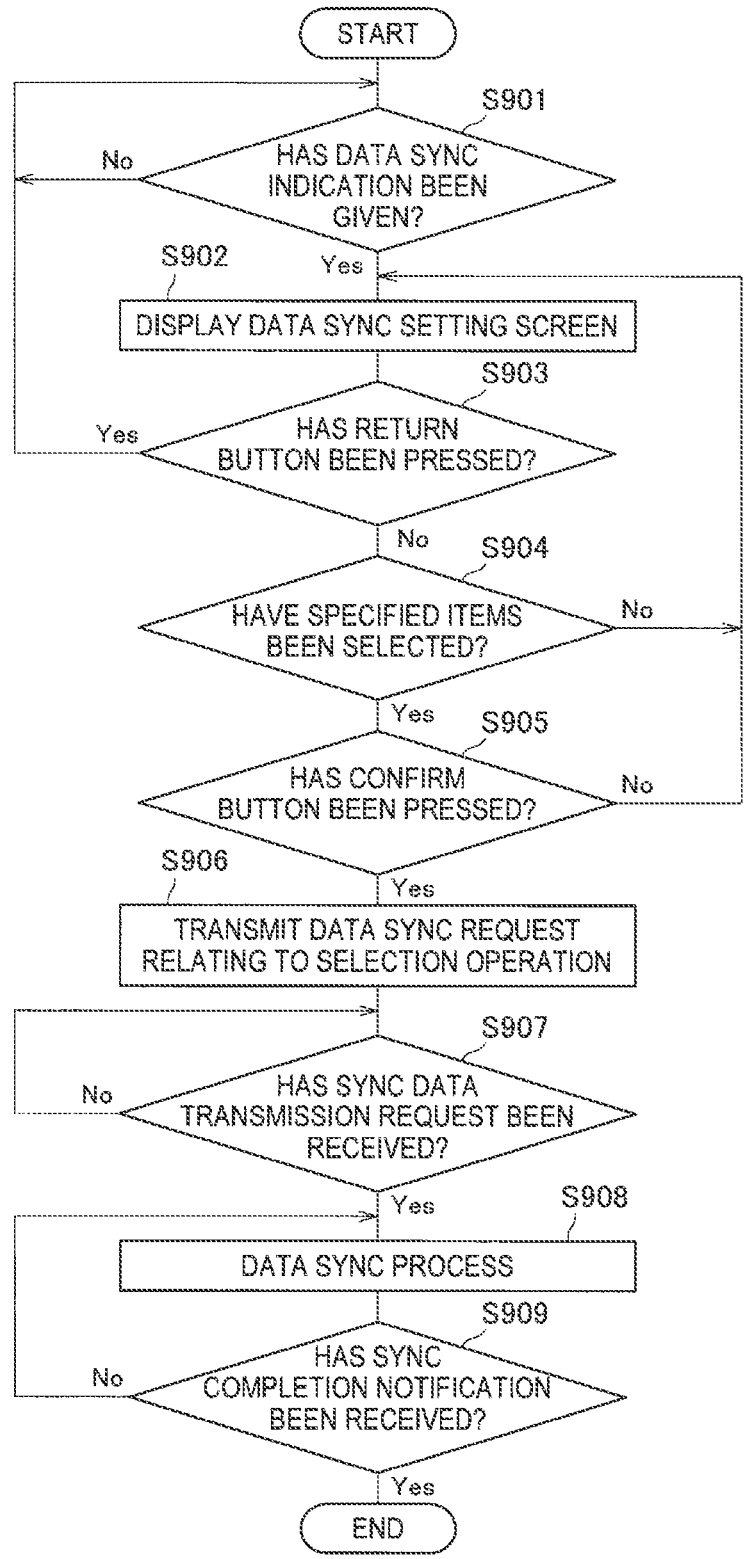

[Fig. 12]
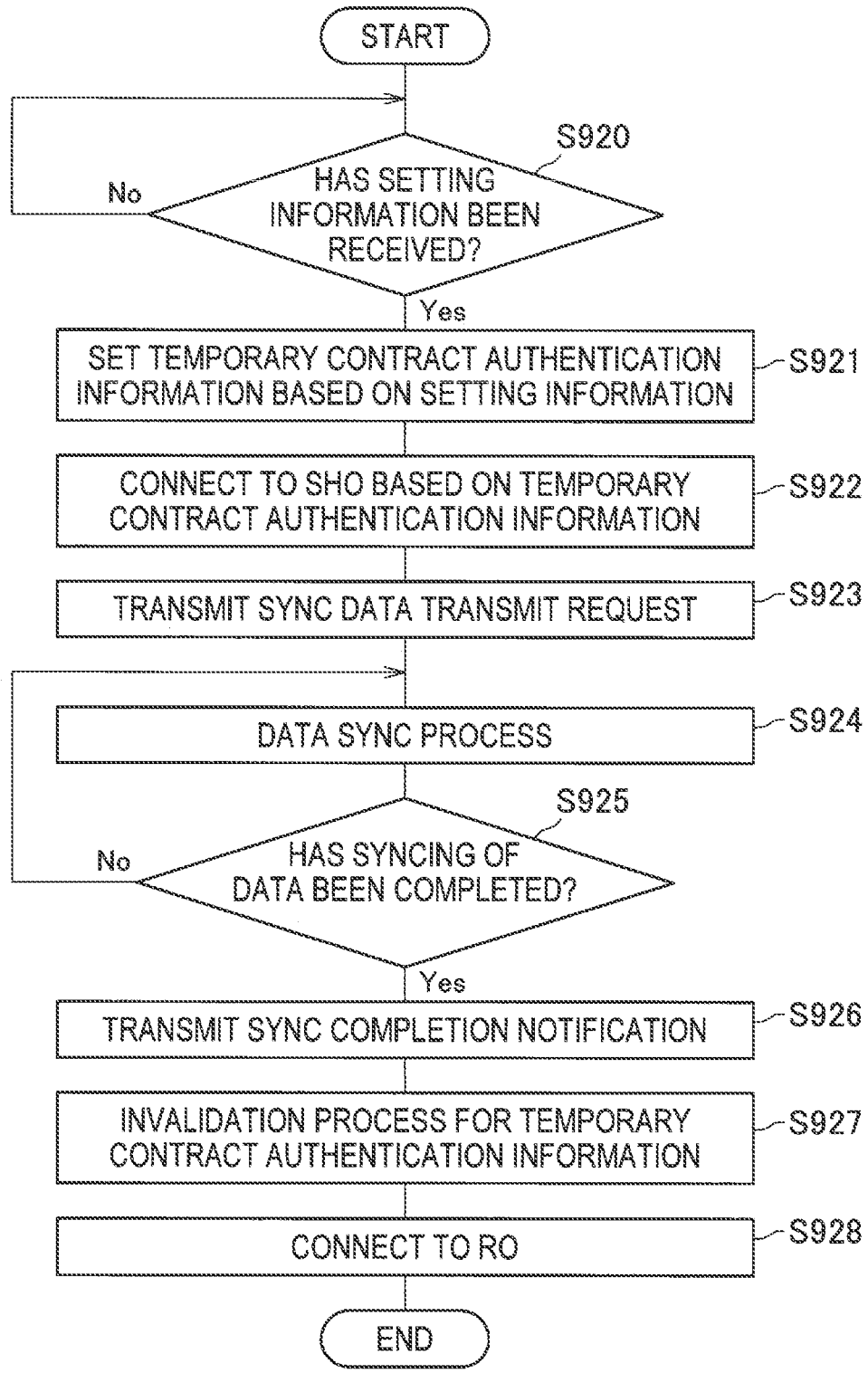

[Fig. 13]
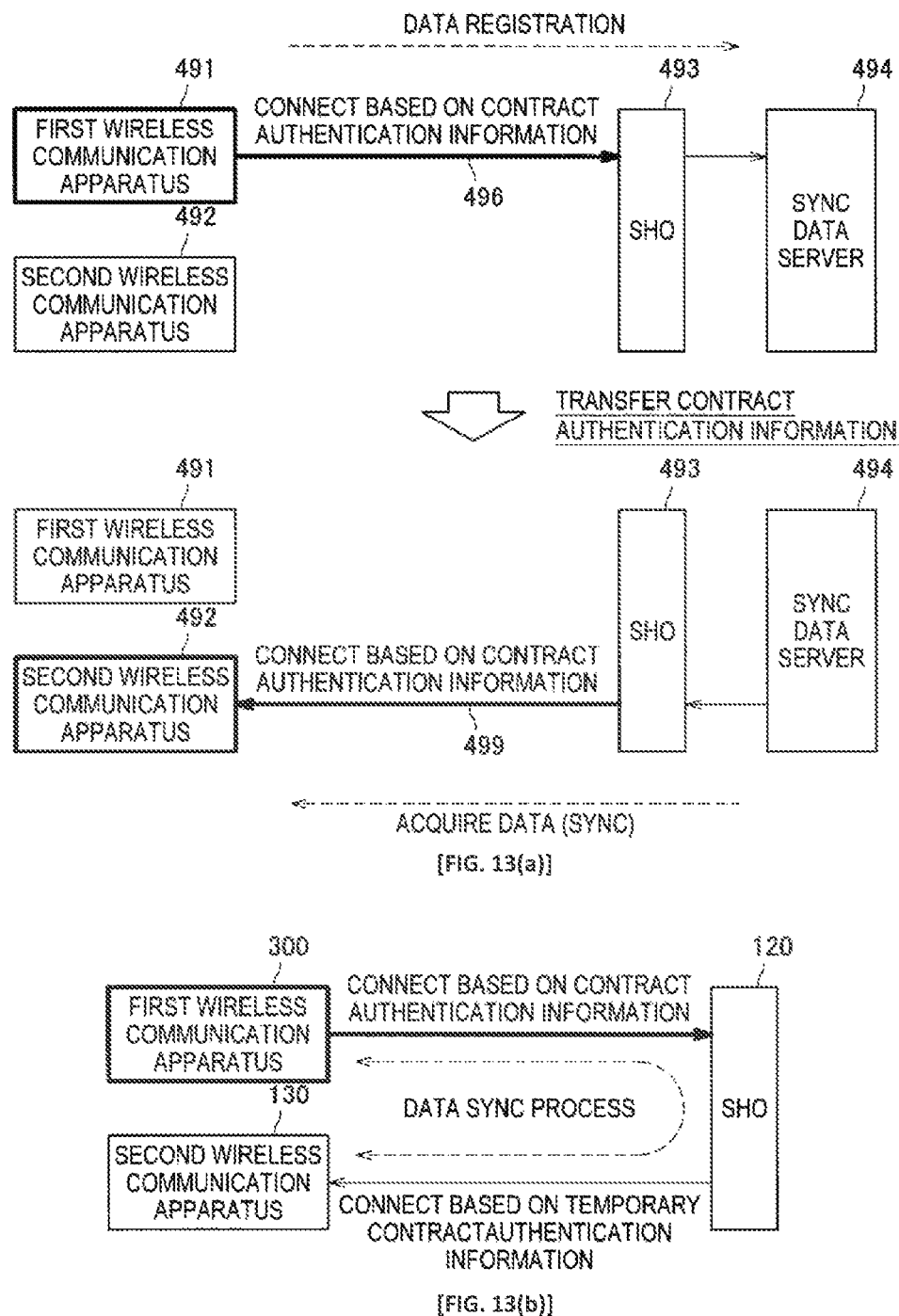

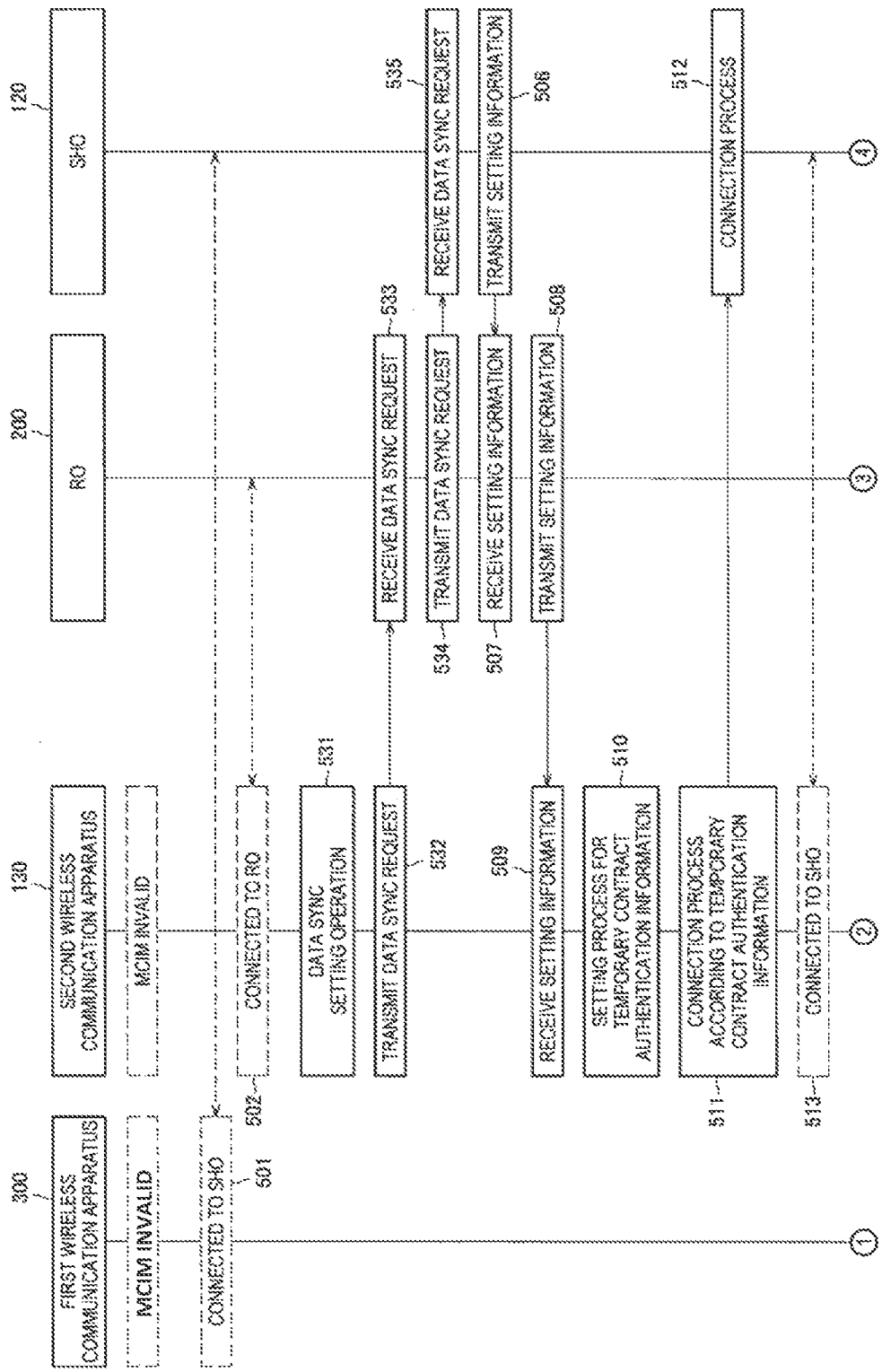
[Fig. 14]

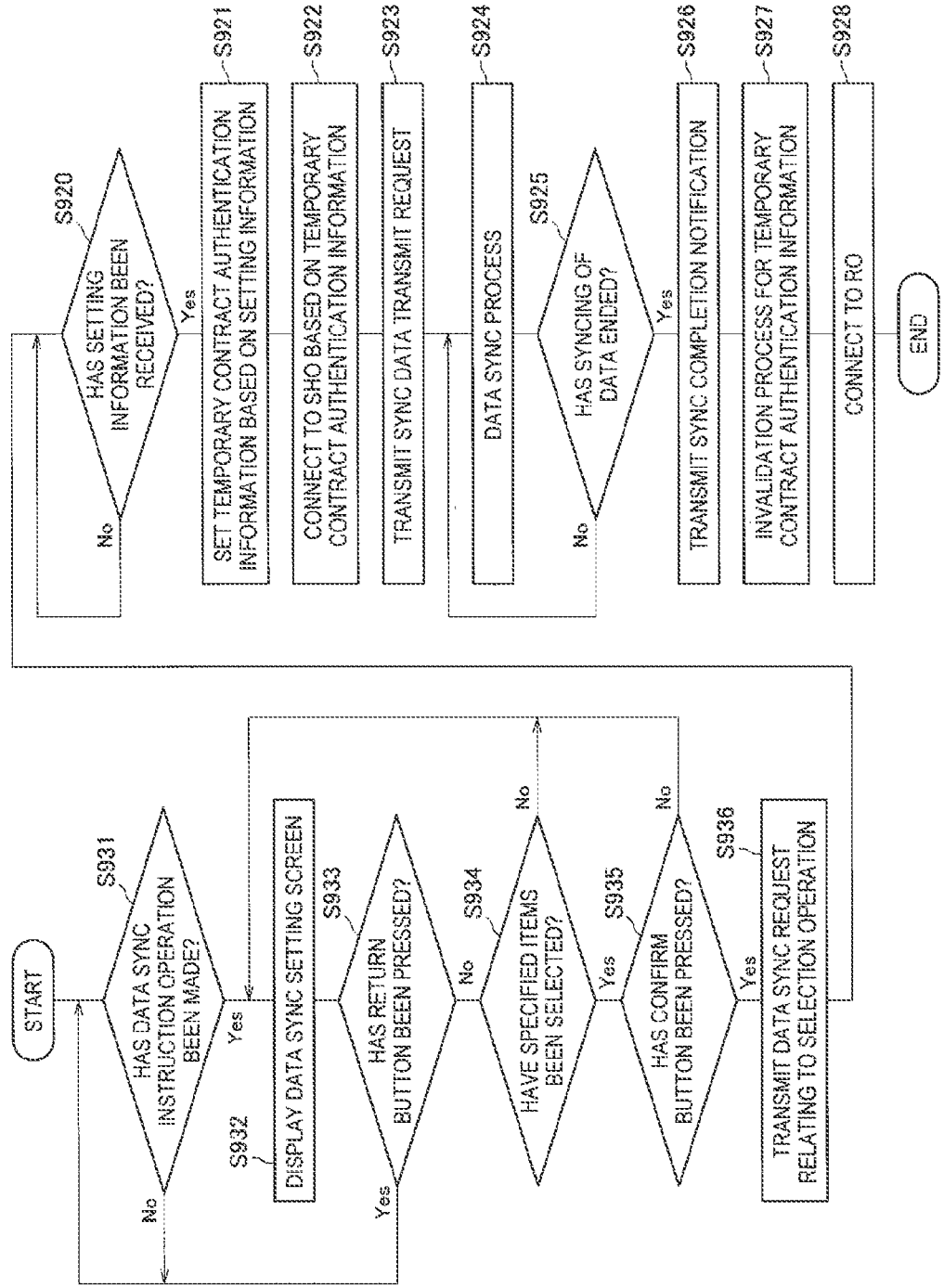

[Fig. 16]
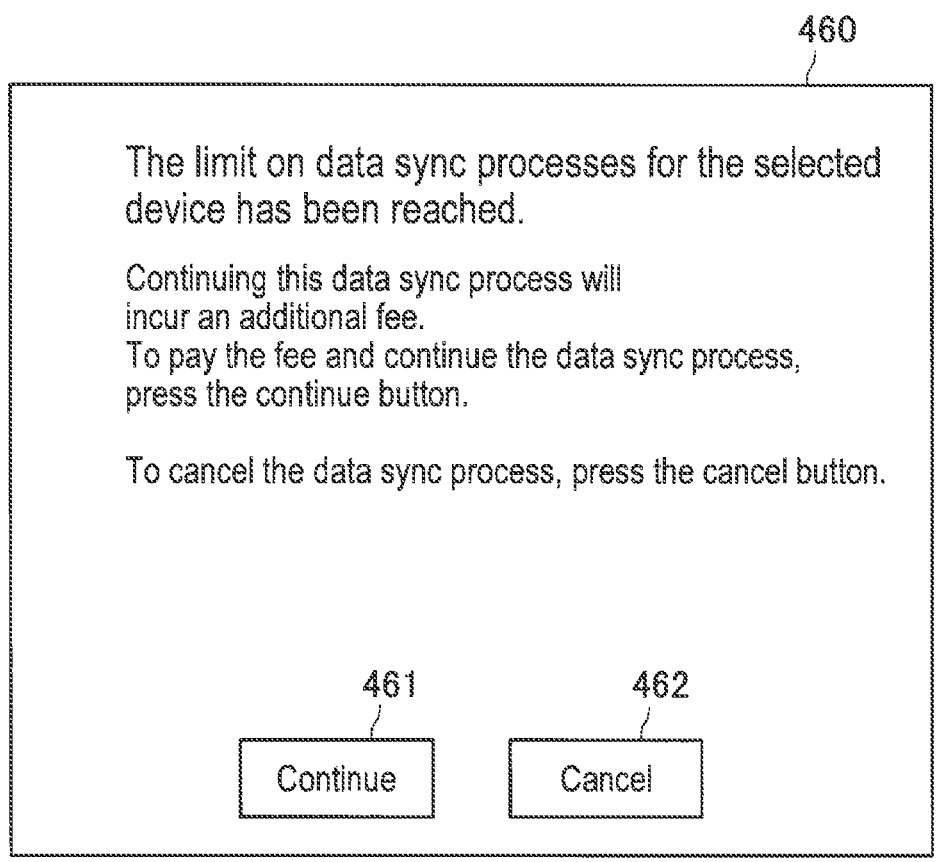

[Fig. 17]
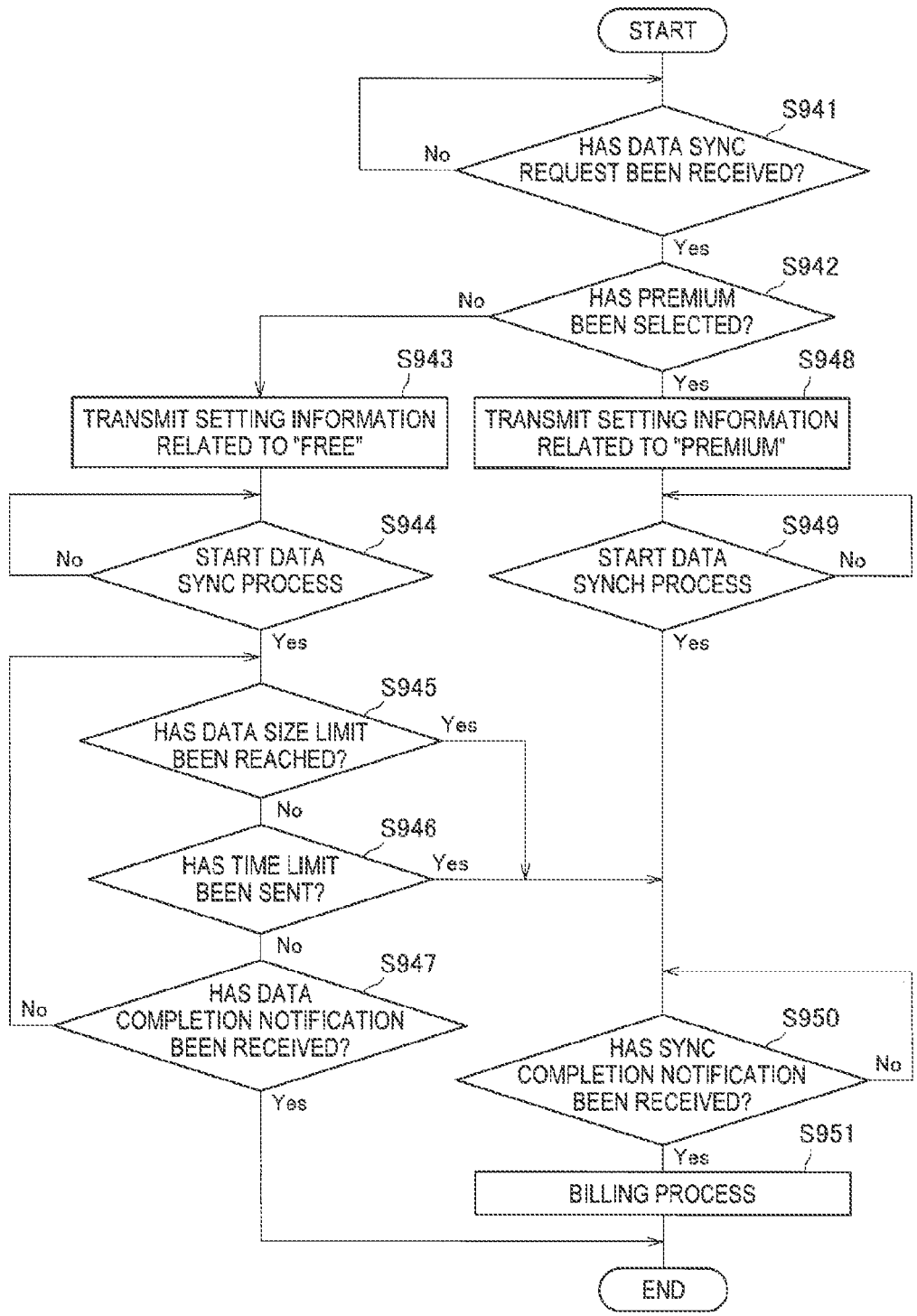

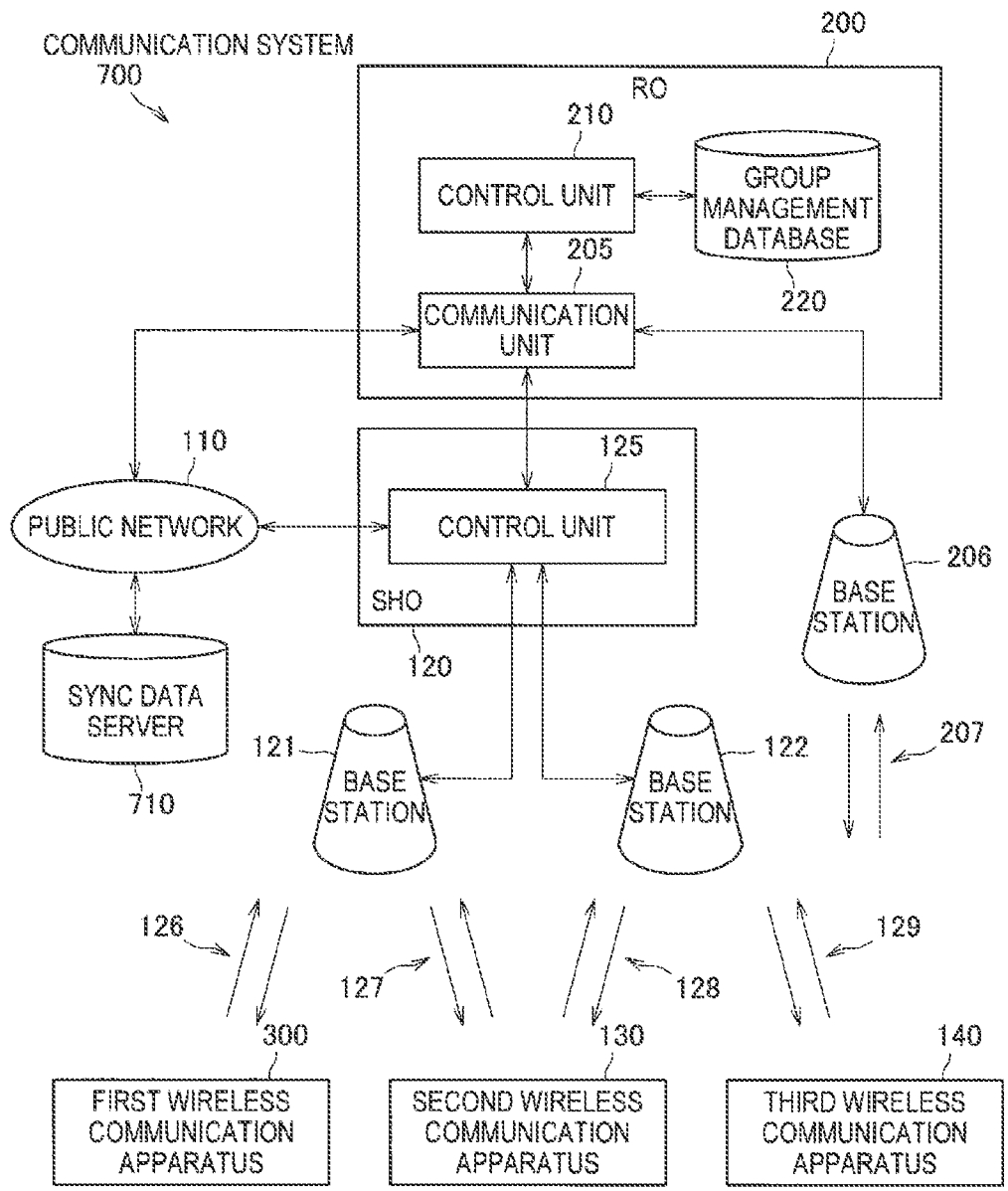
[Fig. 18]

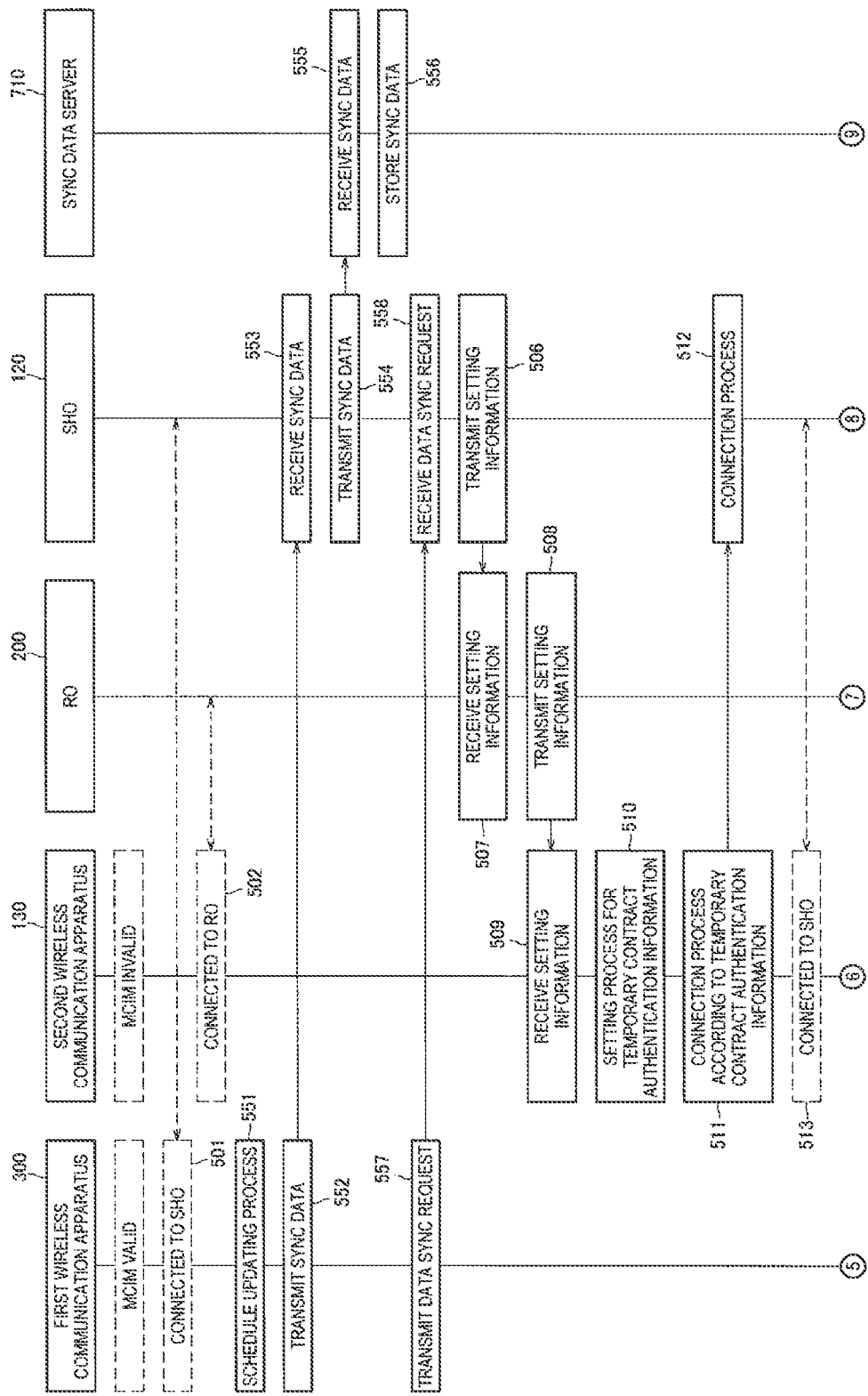

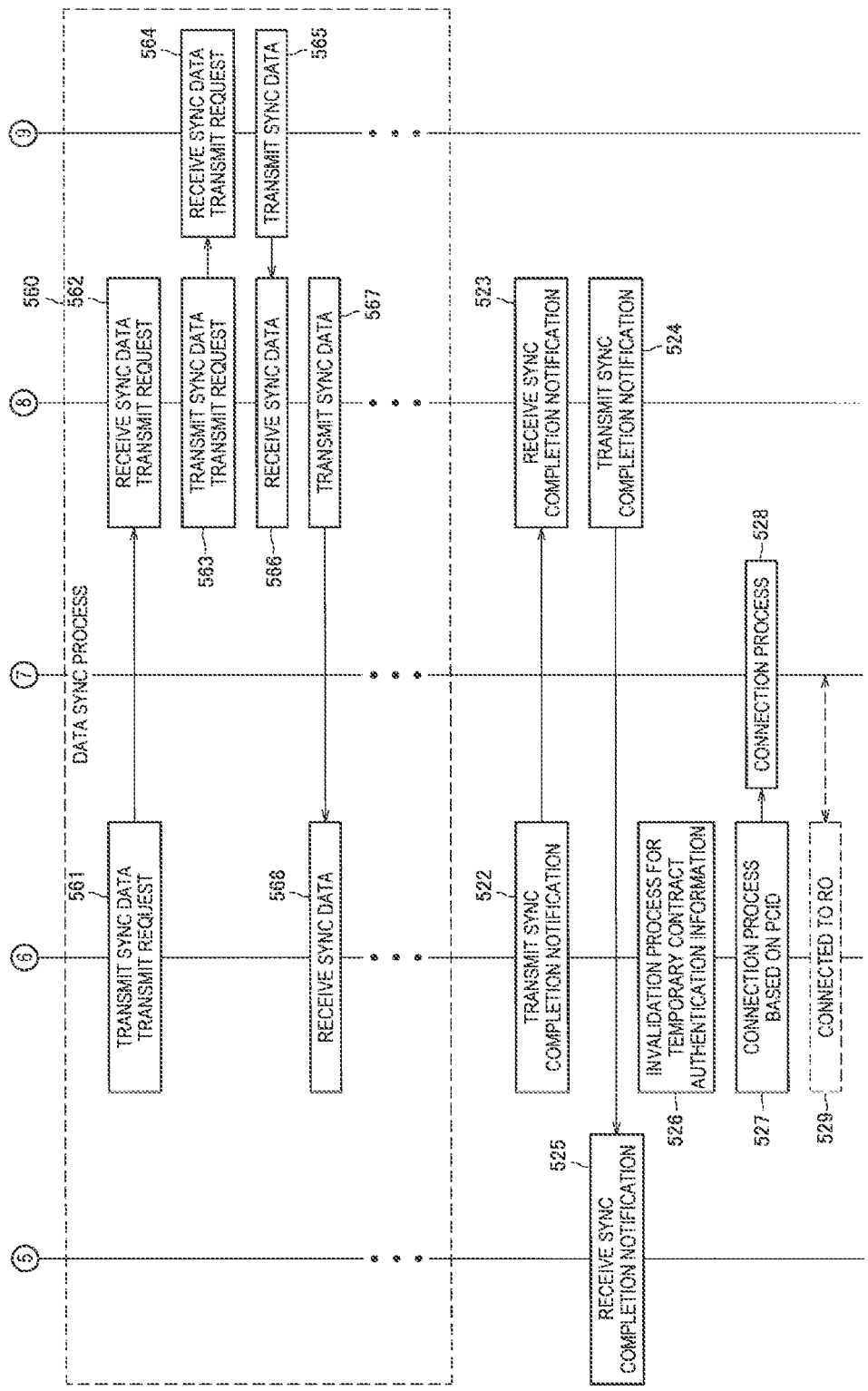
[Fig. 20]

[Fig. 21]
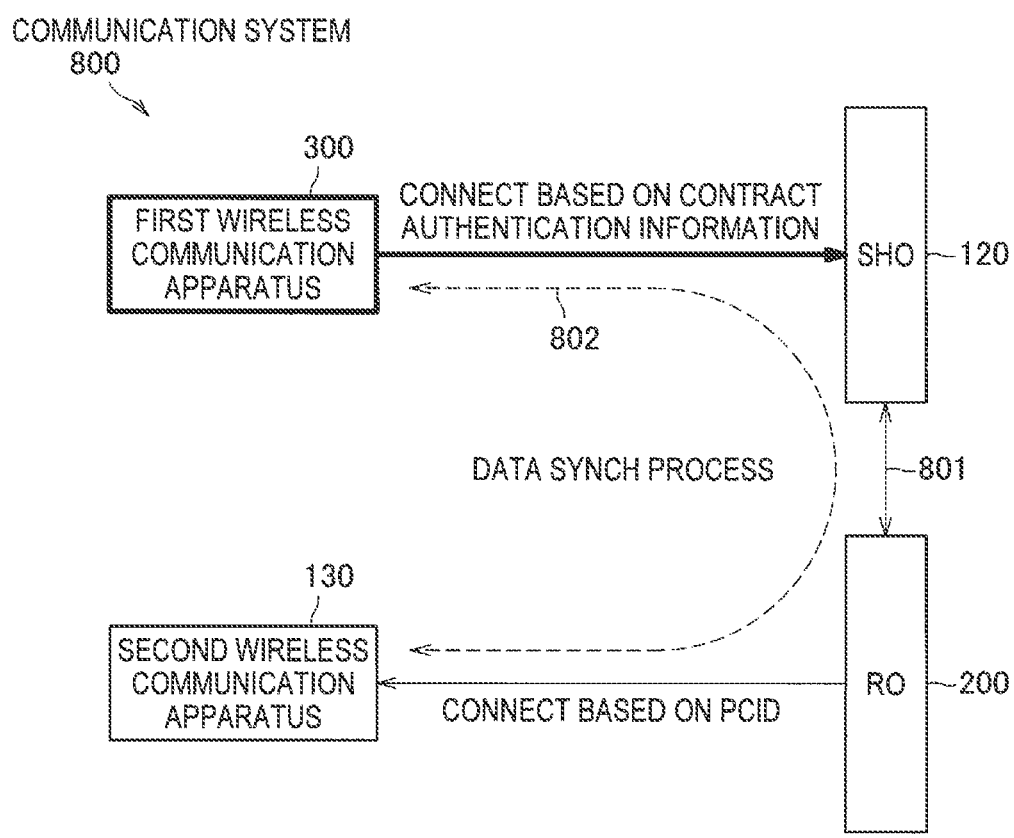

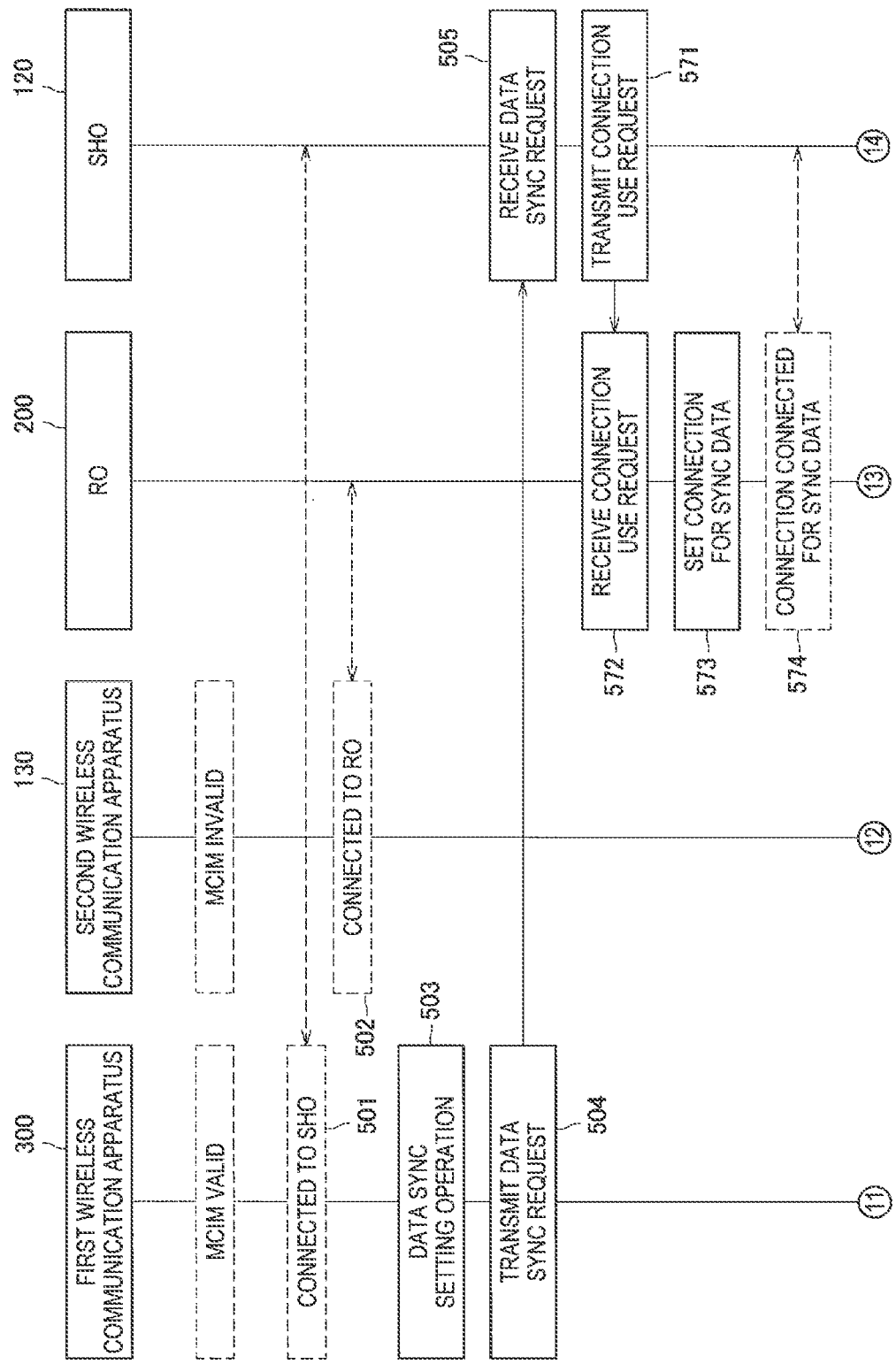

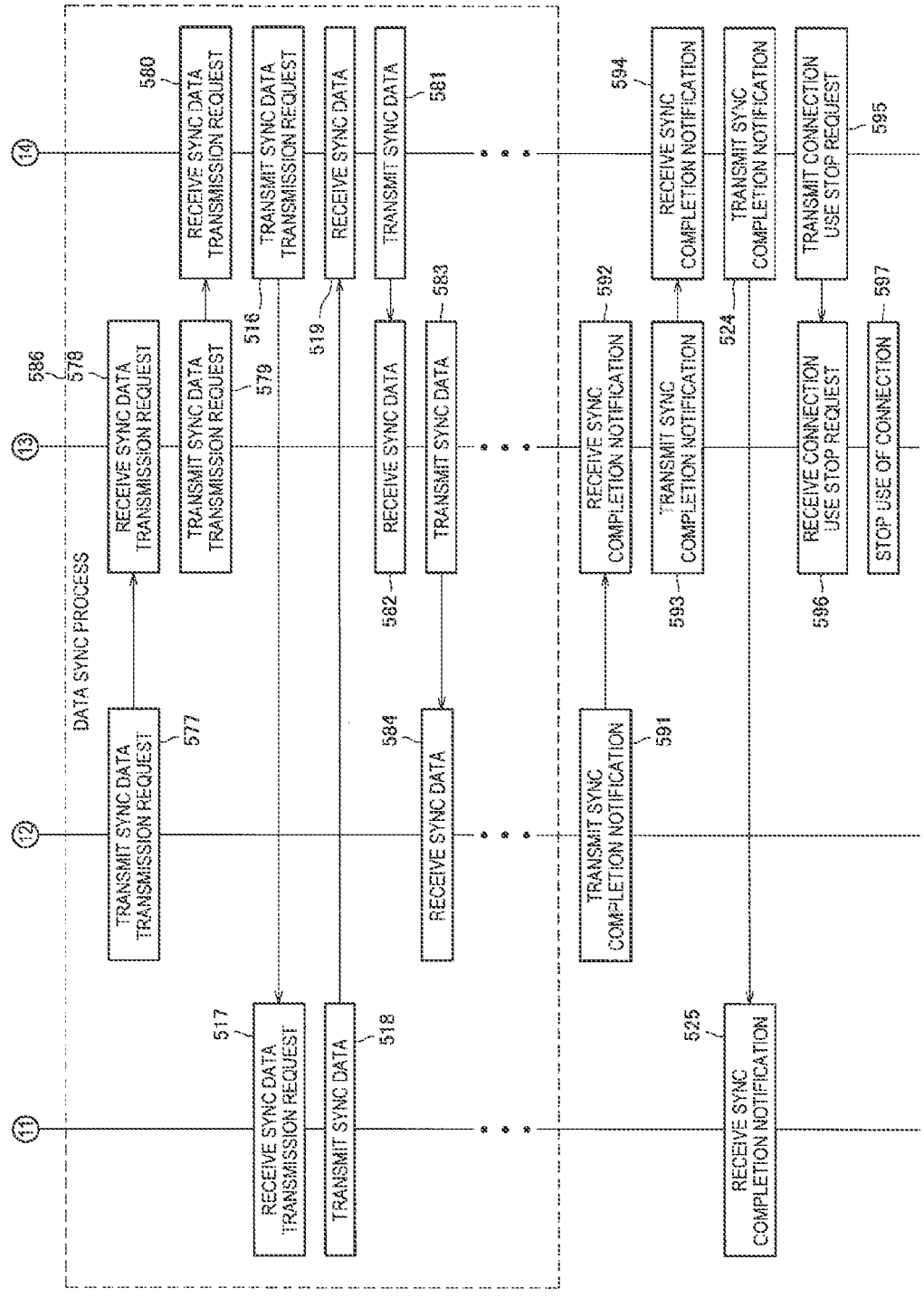

[Fig. 24]
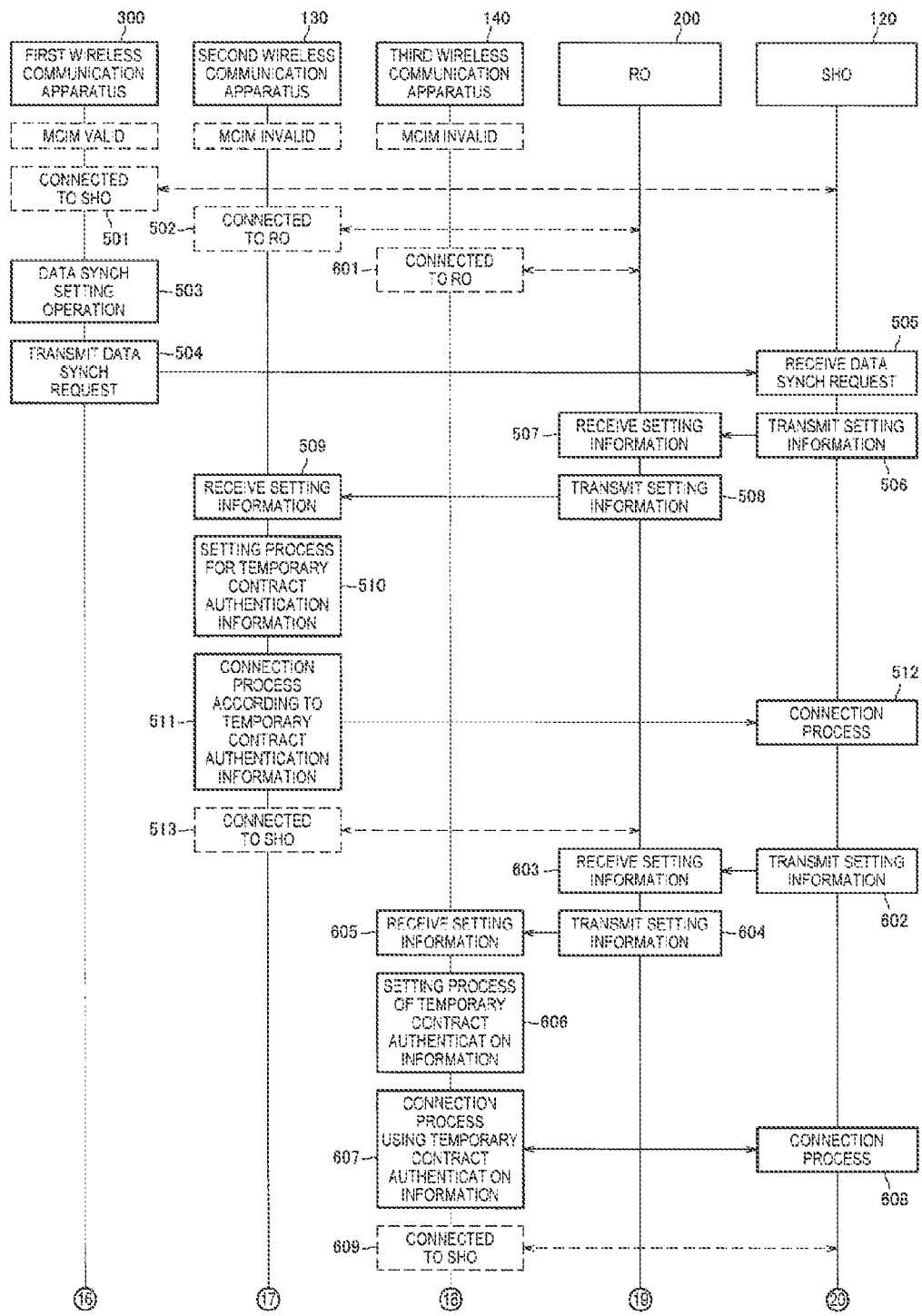

[Fig. 25]
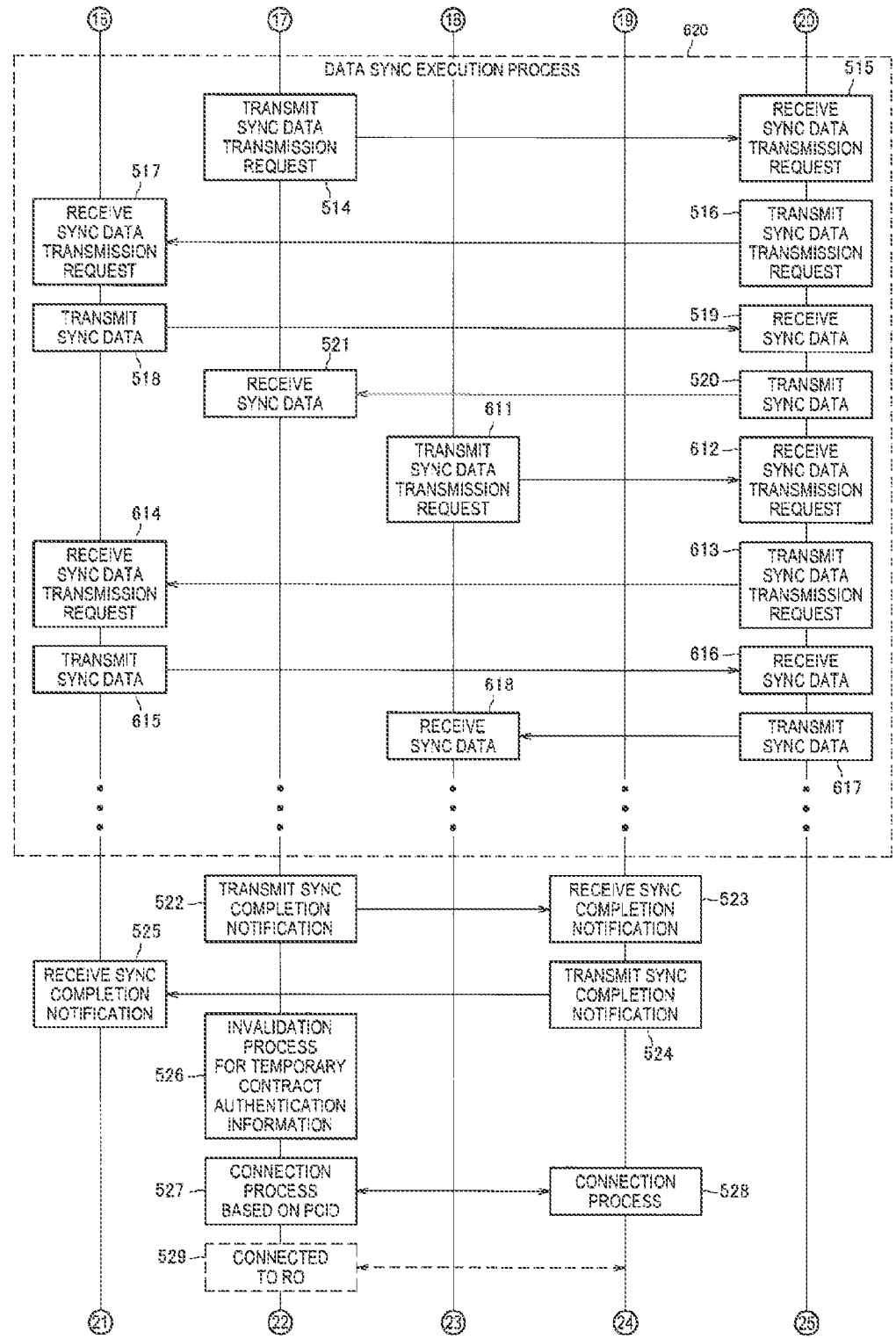

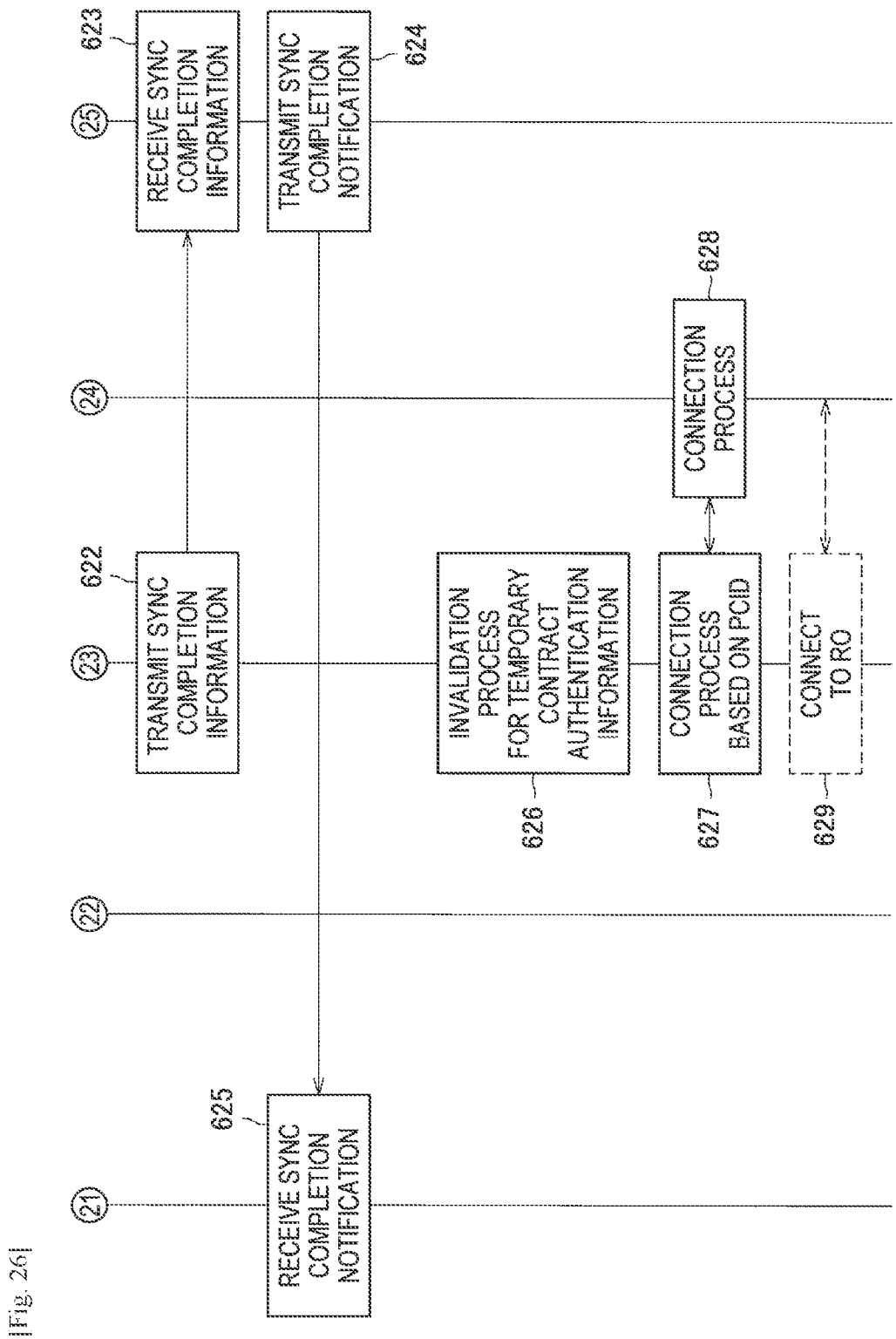

WIRELESS COMMUNICATION APPARATUS, INFORMATION PROCESSING APPARATUS, COMMUNICATION SYSTEM, AND COMMUNICATION METHOD

CROSS-REFERENCE TO RELATED APPLICATIONS

The present application is a continuation application of U.S. patent application Ser. No. 14/119,019, filed Nov. 20, 2013, which is a National Stage Entry of PCT/JP2012/003303, filed May 21, 2012, and claims the benefit of priority from prior Japanese Patent Application JP 2011-124997, filed Jun. 3, 2011, the entire content of which is hereby incorporated by reference.

BACKGROUND

Technical Field

The present disclosure relates to a wireless communication apparatus that connects to a network using corresponding connection rights, an information processing apparatus, a communication system, and a communication method.

Background Art

At present, an expanded functionality is being considered for the $3^{rd}$ Generation Partnership Project (3GPP) that decides the technical specifications of public wireless communication networks (see, for example, 3GPP TR 33.812 V9.2.0 (June 2010)).

By using such expanded functionality (referred to as "Machine to Machine Equipment"), it will become possible to flexibly use information showing what services can be utilized. Such information showing what services can be utilized is known as a Machine Communication Identity Module (MCIM). As an example, it is possible to download an MCIM from a network or to temporarily invalidate and then revalidate an MCIM.

At present, information corresponding to an MCIM needs to be stored in a physical device called a Subscriber Identity Module (SIM) card. However, if an MCIM could be handled as software, the method of storage could be made more flexible.

SUMMARY

By using the expanded functionality described above, it may be possible to conceive new methods of using an MCIM that differ to the past.

For example, a MCIM may be shared between a plurality of wireless communication apparatuses. In such case, it would be convenient if it were possible to easily share data (for example, an address book and/or a calendar) used on such related plurality of wireless communication apparatuses.

Exemplary embodiments of the present disclosure were conceived in view of the above and aims to easily share data used at a plurality of wireless communication apparatuses.

Consistent with an exemplary embodiment, a communications apparatus includes a control circuit configured to establish, through an information processing apparatus, a communications session with an additional communications apparatus associated with one or more first connection rights. The established communications session may be associated with one or more second connection rights that differ from the first connection rights. The control circuit is further configured to generate an instruction to transmit data in accordance with the second connection rights.

Consistent with a further exemplary embodiment, a computer-implemented method establishes, through an information processing apparatus, a communications session with an additional communications apparatus associated with one or more first connection rights. The established communications session may be associated with one or more second connection rights that differ from the first connection rights. Using a processor, an instruction is generated to transmit data in accordance with the second connection rights.

Consistent with another exemplary embodiment, a tangible, non-transitory computer-readable medium stores instructions that, when executed by at least one processor, cause the at least one processor to perform a method that includes establishing, through an information processing apparatus, a communications session with an additional communications apparatus associated with one or more first connection rights. The established communications session may be associated with one or more second connection rights that differ from the first connection rights. The method includes generating an instruction to transmit data in accordance with the second connection rights.

Consistent with an additional exemplary embodiment, an information processing apparatus includes a control circuit configured to establish a communications session between a first communications apparatus associated with one or more first connection rights and a second communications apparatus. The established communications session may be associated with one or more second connection rights that differ from the first connection rights. The control circuit is further configured to generate an instruction to transmit data to the second communications apparatus, in accordance with the second connection rights.

Consistent with a further exemplary embodiment, a computer-implemented method establishes a communications session between a first communications apparatus associated with one or more first connection rights and a second communications apparatus. The established communications session may be associated with one or more second connection rights that differ from the first connection rights. Using a processor, an instruction is generated to transmit data to the second communications apparatus, in accordance with the second connection rights.

Consistent with yet another exemplary embodiment, a tangible, non-transitory computer-readable medium stores instructions that, when executed by at least one processor, cause the at least one processor to perform a method that includes establishing a communications session between a first communications apparatus associated with one or more first connection rights and a second communications apparatus. The established communications session may be associated with one or more second connection rights that differ from the first connection rights. The method includes generating an instruction to transmit data to the second communications apparatus, in accordance with the second connection rights.

Consistent with another exemplary embodiment, a communications system includes a first communication device associated with one or more first connection rights and a second communications apparatus. The communications system also includes an information processing apparatus having a control circuit configured to establish a communications session between the first communications apparatus and the second communications apparatus. The communications session may be associated with one or more second connection rights that differ from the first connection rights. The control circuit is further configured to generate an instruction to transmit data to the second communications apparatus, in accordance with the second connection rights.

According to the disclosed exemplary embodiments, a notable effect whereby data used at a plurality of wireless communication apparatuses can be easily shared may be achieved.

BRIEF DESCRIPTION OF THE DRAWINGS

FIG. 1 is a simplified diagram showing an exemplary usage of a plurality of wireless communication apparatuses or devices according to a first exemplary embodiment.

FIG. 2 is a simplified diagram depicting exemplary changes to address books registered in wireless communication apparatuses, according to the first exemplary embodiment.

FIG. 3 is a diagram of an exemplary configuration of a communication system, according to the first exemplary embodiment.

FIG. 4 is a diagram of an exemplary group management database, according to the first exemplary embodiment.

FIG. 5 is a diagram of an exemplary configuration of a first wireless communication apparatus, according to the first exemplary embodiment.

FIG. 6 illustrates an exemplary screen displayed on a display unit of a first wireless communication apparatus, according to the first exemplary embodiment.

FIGS. 7(a) and 7(b) illustrate exemplary data sync result screens displayed on a display unit of a first wireless communication apparatus, according to the first exemplary embodiment.

FIG. 8 illustrates an exemplary number of syncs limit reached screen displayed on a display unit of a first wireless communication apparatus, according to the first exemplary embodiment.

FIG. 9 is a flow chart of an exemplary communication process performed by a communications system, according to the first exemplary embodiment.

FIG. 10 is a flow chart of an exemplary communication process performed by a communications system, according to the first exemplary embodiment.

FIG. 11 is a flowchart of an exemplary data sync process performed by a first wireless communication apparatus, according to the first exemplary embodiment.

FIG. 12 is a flowchart of an exemplary data sync process performed by a second wireless communication apparatus, according to the first exemplary embodiment.

FIGS. 13(a) and 13(b) are flowcharts of an exemplary data sync process performed by one or more communications systems, according to the first exemplary embodiment.

FIG. 14 is flow chart of an exemplary communication process performed within a communication system, according to a second exemplary embodiment.

FIG. 15 is a flowchart of an exemplary data sync process performed by a second wireless communication apparatus, according to the second exemplary embodiment.

FIG. 16 is a diagram of an exemplary billing notification screen displayed on a display unit of a first wireless communication apparatus, according to a third exemplary embodiment.

FIG. 17 is a flowchart of an exemplary billing process by a selected home operator (SHO), according to the third exemplary embodiment.

FIG. 18 is a diagram illustrating an exemplary configuration of a communication system, according to a fourth exemplary embodiment.

FIG. 19 is a flowchart of an exemplary communication process performed by a communication system, according to the fourth exemplary embodiment.

FIG. 20 is a flowchart of an exemplary communication process performed by a communication system, according to the fourth exemplary embodiment.

FIG. 21 is a flowchart of an exemplary data sync process performed by a communication system using a connection based on a provisional connectivity identity (PCID), according to a fifth exemplary embodiment.

FIG. 22 is a flowchart of an exemplary communication process performed by a communication system, according to the fifth exemplary embodiment.

FIG. 23 is a flowchart of an exemplary communication process performed by a communication system, according to the fifth exemplary embodiment.

FIG. 24 is a flowchart of an exemplary communication process performed by a communication system, according to a sixth exemplary embodiment.

FIG. 25 is a flowchart of an exemplary communication process performed by a communication system, according to the sixth exemplary embodiment.

FIG. 26 is a flowchart of an exemplary communication process performed by a communication system, according to the sixth exemplary embodiment.

DETAILED DESCRIPTION

Hereinafter, exemplary embodiments of the present disclosure will be described in detail with reference to the appended drawings. Note that, in this specification and the appended drawings, structural elements that have substantially the same function and structure are denoted with the same reference numerals, and repeated explanation of these structural elements is omitted. Further, the use of the singular in the description and claims includes the plural unless specifically stated otherwise, and the use of "or" in the description and claims means "and/or" unless stated otherwise.

The exemplary embodiments of the present disclosure will now be described in the order stated below.

1. First Embodiment (Data Sync Process Control: Example of Data Sync Setting at a Wireless Communication Apparatus That Stores a Valid MCIM)
2. Second Embodiment (Data Sync Process Control: Example of Data Sync Setting at a Wireless Communication Apparatus That Does Not Store a Valid MCIM)
3. Third Embodiment (Data Sync Process Control: Example of Billing Related to Data Sync Process)
4. Fourth Embodiment (Data Sync Process Control: Example Where Data Sync Process is Carried Out Automatically)
5. Fifth Embodiment (Data Sync Process Control: Example Where Data Sync Process is Carried Out by Connecting based on a PCID)
6. Sixth Embodiment (Data Sync Process Control: Example Where Data Sync Process is Carried Out Between Three Wireless Communication Apparatuses)

1. First Embodiment a. Example Usage of Wireless Communication Apparatuses

FIG. 1 is a simplified diagram showing an example usage of a plurality of wireless communication apparatuses (or devices,) according to a first exemplary embodiment.

In FIG. 1, the usage states of three wireless communication apparatuses owned by a user 10 are shown. As one example, one wireless communication apparatus (e.g., a first wireless communication apparatus 300) is used outside the home 20 and two wireless communication apparatuses (e.g., a second wireless communication apparatus 130 and a third wireless communication apparatus 140) are placed at home 20.

As examples, the first wireless communication apparatus 300 is a mobile telephone apparatus (for example, a mobile telephone apparatus equipped with a telephone function and a data communication function) and the second wireless communication apparatus 130 is an electronic book display apparatus equipped with a wireless communication function. As one example, the third wireless communication apparatus 140 is an information processing apparatus (for example, a notebook personal computer) equipped with a wireless communication function. Also, it is assumed that the three wireless communication apparatuses are equipped with a management function that manages an address book and/or a calendar.

As one example, a situation can be imagined where the user 10 registers a new contact in the address book of the first wireless communication apparatus 300 while using the first wireless communication apparatus 300 outside the home 20. An example update to the address book in this case is shown in FIG. 2.

b. Example Update of Address Book

FIG. 2 is a simplified diagram showing an example of changes in the address books registered in the respective wireless communication apparatuses according to the first exemplary embodiment.

Note that in FIG. 2, a case is imagined where, in a state where address books with the same content are registered in the respective wireless communication apparatuses (shown at the top in FIG. 2), a new contact (the contact surrounded by a frame 304 drawn with a thick broken line) is registered in the first wireless communication apparatus 300 (shown at the bottom in FIG. 2).

Also in FIG. 2, the change in the address book of the first wireless communication apparatus 300 is shown inside a frame 301, the change in the address book of the second wireless communication apparatus 130 is shown inside a frame 131, and the change in the address book of the third wireless communication apparatus 140 is shown inside a frame 141.

Also, inside the frame 301, the address book before registration of the new contact at the first wireless communication apparatus 300 (or "pre-updating") is shown as the address book 302 and the address book after registration (or "post-updating") is shown as the address book 303. In the same way, inside the frames 131 and 141, the address books before registration of the new contact at the first wireless communication apparatus 300 (or "pre-updating") are shown as the address books 132 and 142 and the address books after registration are shown as the address books 133 and 143. Note that for ease of explanation, an example where only names and telephone numbers are registered in the address books is shown in FIG. 2. Also, the names are shown using simplified characters (first names such as "Keisuke" and "Ryoko") and the telephone numbers are shown using simplified numbers (such as "000000" and "111111").

Also, the newly registered contact is shown by the frame 304 drawn with a thick broken line in the address book 303.

When the user 10 newly registers a contact as shown in the frame 304 of the address book 133, the registered contact is registered in the address book of the wireless communication apparatus where the registration operation was carried out (i.e., the first wireless communication apparatus 300). Here, a case is imagined where the new contact registered in the first wireless communication apparatus 300 is registered in the second wireless communication apparatus 130 and the third wireless communication apparatus 140. As one example, it would be possible for the user 10 to carry out registration operations that register the new contact in the second wireless communication apparatus 130 and the third wireless communication apparatus 140, respectively. However, in such a situation, it would be necessary to carry out a registration operation at each wireless communication apparatus, which makes the registration operation complex. For this reason, it would be conceivable to instead carry out data communication (as one example, near field communication) between the wireless communication apparatuses so as to perform a data sync process for the data in the address books. However, if the wireless communication apparatuses are located far apart as shown in FIG. 1, such data communication cannot be carried out. For this reason, it would be conceivable to store contract authentication information in each wireless communication apparatus and to carry out a data sync process by way of data communication on a specified network. In this case, since it would be necessary to store contract authentication information in each wireless communication apparatus, fees related to such contracts would be required. For this reason, in the first embodiment of the present disclosure, an example where a contact newly registered in the first wireless communication apparatus 300 is easily synced (shared) with the second wireless communication apparatus 130 and the third wireless communication apparatus 140 is shown.

c. Example Configuration of Communication System

FIG. 3 is a block diagram showing an example of the system configuration of a communication system 100 according to the first exemplary embodiment The communication system 100 includes a public network 110, base stations 121, 122, and 206, the first wireless communication apparatus 300, the second wireless communication apparatus 130, and the third wireless communication apparatus 140. The communication system 100 also includes an SHO (Selected Home Operator) 120 and an RO (Registration Operator) 200. In this way, according to the first embodiment of the present disclosure, an example of a network configuration constructed from the SHO 120 and the RO 130 is shown (see, for example, 3GPP TR 33.812 V9.2.0 (June 2010)).

Here, the RO and SHO represent logical roles and although a case where such devices are operated by different businesses is imagined, it would also be possible for the same business to operate both devices. It is also possible for multiple RO and SHO to be present. Also, RO and SHO may be configured as a single information processing apparatus or may be constructed of a plurality of apparatuses. Here, RO and SHO refer to relative roles with respect to a particular wireless communication apparatus in possession of a valid MCIM. This means that it is possible for a device that corresponds to an RO for one wireless communication apparatus to correspond to an SHO for a different wireless communication apparatus.

As one example, a case is imagined where the first wireless communication apparatus 300 stores a valid MCIM, and neither the second wireless communication apparatus 130 nor the third wireless communication apparatus 140 stores a valid MCIM. In this case, only the first wireless communication apparatus 300 is capable of connecting to the SHO 120. On the other hand, the second wireless communication apparatus 130 and the third wireless communication apparatus 140 that do not store a valid MCIM are capable of connecting to the RO 200 based on a PCID.

Here, the MCIM is one example of contract authentication information and such contract authentication information is information including telephone subscriber information and authentication key information. As one example, an MCIM is contract authentication information (a so-called "soft SIM (Subscriber Identity Module)") that is not limited to a specified communication provider (for example, a mobile telephone provider) when a device is purchased and can be flexibly set by a communication provider after purchase. Also, as examples, the expression "when a valid MCIM is not stored" refers to when an MCIM itself is not stored or when only MCIM that have been invalidated by an MCIM invalidation process are stored.

Also, the PCID is an identifier (for example, the terminal identification information 225 on a network shown in FIG. 4) for connecting to the RO and is assigned to every wireless communication apparatus (device).

Here, by transferring the use rights over the MCIM (i.e., the right to use the MCIM) between a plurality of wireless communication apparatuses, it is possible to share the use rights over the MCIM between a plurality of wireless communication apparatuses. In such case, it is possible to set the plurality of wireless communication apparatuses related to such sharing as a single group. Such group can be managed using a group management database 220.

The public network 110 is a public network such as a telephone network or the Internet. The public network 110 and the SHO 120 are connected via a gateway (not shown). In the same way, the public network 110 and the RO 200 are connected via a gateway (not shown).

The SHO 120 is a communication control apparatus managed by a wireless provider that provides a wireless connection service. The SHO 120 provides Internet services and the like, and as one example corresponds to a wireless provider (for example, a mobile telephone provider) that provides wireless connection services. The SHO 120 is equipped with a control unit 125.

The control unit 125 carries out authentication control of wireless communication apparatuses connected via the base stations 121, 122. As one example, out of the wireless communication apparatuses connected via the base stations 121, 122, the control unit 125 authenticates wireless communication apparatuses storing valid contract authentication information (i.e., an MCIM) for the SHO 120 or temporary contract authentication information for the SHO 120. The SHO 120 also connects the authenticated wireless communication apparatuses via a gateway (not shown) to the public network 110.

The temporary contract authentication information mentioned above will now be described. This temporary contract authentication information is contract authentication information that has been assigned certain limits and is contract authentication information temporarily issued by the SHO 120. As such limits, conceivable examples would be a limit on number of uses (for example, four times in one day), a limit on processing (for example, use for a data sync process only), a limit on time (for example, within one hour), and a limit on size (for example, up to 300 KB). Note that contract authentication information that has been assigned a time limit can be understood as contract authentication information with an expiry date/time (for example, an MCIM assigned a limit so that the MCIM automatically becomes invalid when a fixed period has elapsed). As another example, if a limit on usage (the "limit on processing" mentioned above) has been assigned to limit usage to a data sync process, to enable use (temporary use) during the data sync process, the temporary contract authentication information may be issued at the start of the data sync process and invalidated at the end of the data sync process. The SHO 120 is also capable of managing data relating to temporary contract authentication information, such as the number of times such information has been issued (an upper limit on the number of issues per day), the data amount, the valid time, and the like. In such case, when an upper limit for a set value under management is exceeded, it is possible to prohibit or interrupt the data sync process.

The control unit 125 is connected to the RO 200 and exchanges various information with the RO 200. Here, a wireless communication apparatus that does not store a valid MCIM (contract authentication information) is capable of connecting (with a limited connection) via the SHO 120 to the RO 200 based on the PCID (Provisional Connectivity Identity) of the wireless communication apparatus. Also, when a data sync request (a setting request) has been received from a wireless communication apparatus, the control unit 125 transmits the setting information to a wireless communication apparatus that does not store a valid MCIM out of the plurality of wireless communication apparatuses that will execute the data sync process. Here, a "data sync request" is a request for starting a data sync process. The "setting information" includes temporary contract authentication information and is information for setting such temporary contract authentication information in a wireless communication apparatus that does not store a valid MCIM and causing such apparatus to synch the data related to the data sync request.

The base stations 121, 122 are mobile communication base stations (NodeB) that connect the first wireless communication apparatus 300, the second wireless communication apparatus 130, and the third wireless communication apparatus 140, to the SHO 120 via wireless connections 126 to 129.

As one example, in the communication system 100, a wireless communication apparatus that stores a valid MCIM is connected via wireless connections 126 to 129 to the base stations 121, 122 and is connected via the base stations 121, 122 to the SHO 120. The wireless communication apparatus that stores the valid MCIM is further connected via the SHO 120 to the RO 200.

Also, a wireless communication apparatus that does not store a valid MCIM (contract authentication information) is capable of connecting (with a limited connection) to the RO 200 via the wireless connection 207 and the base station 206 based on the PCID of the wireless communication apparatus. Note that a wireless communication apparatus that does not store a valid MCIM is capable of connecting to any of the base stations 121, 122, and 206 in accordance with the location at which such apparatus is used and of further connecting via such base stations to the RO 200.

The RO 200 provides services such as initial connection and registration and includes a communication unit 205, the control unit 210, and the group management database 220.

The communication unit 205 transmits and receives various information based on control by the control unit 210. The communication unit 205 is connected for example to the SHO 120 and transmits and receives various information to and from the respective wireless communication apparatuses connected via the SHO 120. For example, if a data sync request has been received from a wireless communication apparatus via a connection based on a PCID, the communication unit 205 transmits such data sync request to the SHO 120. Also, if temporary contract authentication information has been transmitted from the SHO 120, the communication unit 205 transmits the temporary contract authentication information to the wireless communication apparatus in which such information is to be set via a connection based on a PCID.

The control unit 210 carries out various control relating to a wireless communication apparatus connected via the communication unit 205 (the communication unit 205 and the SHO 120). For example, the control unit 210 acquires information relating to a group composed of a plurality of wireless communication apparatuses that share a MCIM from the control unit 220 and supplies the acquired information via the communication unit 205 and the SHO 120 to the wireless communication apparatus.

Hereinafter, the above-mentioned group will be explained. The group is a group that shares network connection rights. Such network connection rights (first connection rights) are the right to connect to a specified network (for example, the public network 110) via a wireless communication and as one example correspond to use rights over an MCIM. That is, the network connection rights are rights for connecting to base stations operated by a communication provider based on an MCIM (contract authentication information) for connecting to such base stations. For example, the presence or absence of such network connection rights can be decided according to the presence or absence of use rights over an MCIM.

Also, use rights over the temporary contract authentication information described earlier can be understood as second connection rights, which are connection rights for carrying out data communication and are more limited than network connection rights ("first connection rights"). That is, the second connection rights can be understood as rights for connecting to a base station operated by the SHO 120 based on contract authentication information with a limit for at least one of data to be processed, a size of the data, and a processing time in the data communication. In such embodiments, one or more of the second connection rights may be different from the first connection rights, and additionally or alternatively, the second connection rights may represent a subset of the first connection rights.

On receiving a data sync request (setting request) that requests setting of the second connection rights in a wireless communication apparatus where the first connection rights are not set, the control unit 125 carries out control to set the second connection rights in the wireless communication apparatus that does not store the first connection rights. Here, as one example, it is possible to determine in which wireless communication apparatuses the first connection rights are set based on MCIM management information stored in the SHO 120 (information for managing which wireless communication apparatuses store a valid MCIM). It is also possible to acquire the content of the group management database 220 (for example, the valid/invalid information 226 shown in FIG. 4) and make a determination based on such content. Note that the control unit 125 is one example of the "reception unit" and the "control unit" provided in the "information processing apparatus" referred to in the patent claims.

The group management database 220 is a database for managing groups which are each composed of a plurality of wireless communication apparatuses sharing an MCIM. Note that the group management database 220 will be described in detail with reference to FIG. 4.

Here, an example will be described where use rights over the MCIM are transferred (i.e., where the network connection rights are transferred) in the communication system 100. For example, the MCIM is stored in advance in the respective wireless communication apparatuses. Based on an instruction from the control unit 210, the SHO 120 is capable of transferring the use rights over the MCIM by validating or invalidating the MCIM of the respective wireless communication apparatuses.

Instead of storing the MCIM in the respective wireless communication apparatuses, it is also possible to transfer use rights over the MCIM by transferring the MCIM itself. As one example, a case where use rights over the MCIM are transferred from the first wireless communication apparatus 300 to the second wireless communication apparatus 130 is imagined. For example, an MCIM transfer request is transmitted from the first wireless communication apparatus 300 to the control unit 210. In this case, based on an instruction from the control unit 210, the MCIM stored in the first wireless communication apparatus 300 is invalidated (deleted) by the SHO 120. In addition, transfer information (setting information including the MCIM) is transmitted via the control unit 210 from the SHO 120 to the second wireless communication apparatus 130. By storing the MCIM included in the transfer information in the second wireless communication apparatus 130, a valid MCIM is set in the second wireless communication apparatus 130.

d. Example Configuration of Group Management Database

FIG. 4 is a table schematically showing the group management database 220 according to the first exemplary embodiment.

FIG. 4 shows a case where the first wireless communication apparatus 300, the second wireless communication apparatus 130, and the third wireless communication apparatus 140 are registered in group AB.

In the group management database 220, a group name 221, a group ID 222, a group password 223, a device name 224, terminal identification information 225, and valid/invalid information 226 are stored so as to be associated with one another in group units. Such information is successively updated by the control unit 210 based on requests (group addition requests, group deletion requests) from the respective wireless communication apparatuses, for example.

A name assigned to a group is stored in the group name 221. Such name is stored for example when a group is generated.

A group ID assigned to a group is stored in the group ID 222. A password assigned to a group is stored in the group password 223. Using such ID and password, a group addition request, for example, for adding newly a wireless communication apparatus, is made. The respective wireless communication apparatuses belonging to a group may store in advance the ID and password assigned to such group (for example, storage in a memory 340 shown in FIG. 5). Alternatively, an arrangement may be used where the ID and password are not stored in a wireless communication apparatus and are inputted each time by the user.

Names assigned to devices are stored in the device name 224. As one example, such names are stored when devices are newly added to a group of wireless communication apparatuses.

Terminal identification numbers of wireless communication apparatuses (devices) are stored in the terminal identification information 225. Terminal identification information is identification information for identifying a wireless communication apparatus, and as one example a PCID is stored. In FIGS. 4(*a*) and 4(*b*), "PCID #1" in the terminal identification information 225 corresponds to the first wireless communication apparatus 300. In the same way, "PCID #2" in the terminal identification information 225 corresponds to the second wireless communication apparatus 130 and "PCID #3" in the terminal identification information 225 corresponds to the third wireless communication apparatus 140.

Information showing whether the MCIM at the wireless communication apparatus is valid or invalid (or an MCIM is yet to be stored) is stored in the valid/invalid information 226. Note that in FIG. 4, for ease of explanation, a wireless communication apparatus where the MCIM is valid is shown as "valid" and a wireless communication apparatus where the MCIM is invalid is shown as "invalid."

In this way, a group composed of a plurality of wireless communication apparatuses that share an MCIM is managed in the group management database 220. Note that in the first embodiment of the present disclosure, a case where a data sync process is carried out between wireless communication apparatuses belonging to the same group is imagined.

e. Example Construction of Wireless Communication Apparatus

FIG. 5 is a block diagram showing an example of the internal configuration of the first wireless communication apparatus 300 according to the first exemplary embodiment. Note that since the internal configurations of the second wireless communication apparatus 130 and the third wireless communication apparatus 140 are the same as that of the first wireless communication apparatus 300, description thereof is omitted here. Also, in FIG. 6 onwards, when describing the second wireless communication apparatus 130 or the third wireless communication apparatus 140, names and reference numerals corresponding to the first wireless communication apparatus 300 are used.

The first wireless communication apparatus 300 includes an antenna 311, an antenna sharing unit 312, a modulating unit 321, a demodulating unit 322, a control unit 330, a memory 340, and the MCIM information storage unit 350. The first wireless communication apparatus 300 also includes an operation unit 360, a display unit 370, a location information acquiring unit 380, a microphone 391, and a speaker 392. Such components are connected by a bus 331. As one example, the first wireless communication apparatus 300 is realized by a mobile telephone apparatus capable of telephone calls and data communication.

For example, when a reception process is carried out, radio waves received by the antenna 311 are demodulated via the antenna sharing unit 312 by the demodulating unit 322 and demodulated reception data is supplied to the control unit 330. When the reception process is an incoming call process, the demodulated reception data (audio data) is outputted via the control unit 330 from the speaker 392 as sound.

When, for example, a transmission process is carried out, the transmission data outputted by the control unit 330 is modulated by the modulating unit 321 and the modulated transmission data is transmitted via the antenna sharing unit 312 from the antenna 311. When the transmission process is an outgoing call process, audio data inputted from the microphone 391 is modulated via the control unit 330 by the modulating unit 321 and modulated transmission data (audio data) is transmitted via the antenna sharing unit 312 from the antenna 311.

The control unit 330 carries out various control based on a control program stored in the memory 340. As one example, the control unit 330 is constructed of a microprocessor. For example, the control unit 330 is connected to the modulating unit 321 and the demodulating unit 322 and transmits and receives various data to and from the SHO 120 connected via the base stations 121, 122. The control unit 330 also carries out a connection process that connects to the RO 200 (with a limited connection) via a wireless connection based on the PCID, for example, without using the MCIM.

The memory 340 is a memory storing a control program for enabling the control unit 330 to carry out various control, in addition to transmission data, reception data, and the like. As examples, the memory 340 is constructed of ROM (Read Only Memory) and/or RAM (Random Access Memory). Terminal identification information (PCID #1) for specifying the first wireless communication apparatus 300 and a device name (for example, the device name 224 shown in FIG. 4) of the first wireless communication apparatus 300 are also stored in the memory 340. Such device name is registered for example by a user operation. The ID and password assigned to the group AB to which the first wireless communication apparatus 300 belongs (as one example, the group ID 222 and the group password 223 shown in FIG. 4) are also stored in the memory 340. As one example, such group ID and password are included in a group addition authentication result given in response to a group addition request, transmitted from the RO 200, and stored in the memory 340.

Also, content relating to an address book (for example, the address book 302 shown in FIG. 2) and a calendar are recorded in the memory 340.

The MCIM information storage unit 350 is a memory storing an MCIM (contract authentication information). As the MCIM information storage unit 350, as examples it is possible to use a UICC (Universal Integrated Circuit) card or a dedicated memory for securely storing an MCIM. Note that when a UICC card is used as the MCIM information storage unit 350, instead of the MCIM being permanently written, a card capable of a validation process and an invalidation process for the MCIM is used. That is, a device that enables the control unit 330 to carry out a validation process and an invalidation process for an MCIM based on transfer information that has been received from the antenna 311 and demodulated is used. Also, a device that allows the MCIM to be rewritten is used. Note that the validation process and invalidation process for the MCIM can be carried out according to the validation process and invalidation process defined by the Third Generation Partnership Project (i.e., 3GPP). Also, by providing a secure region in the memory 340, the MCIM information storage unit 350 may be provided inside the memory 340.

Here, as one example, when an operation input for carrying out a data sync process has been received by the operation unit 360 in a state where the MCIM is valid, the control unit 330 carries out control to transmit a data sync request via a wireless connection to the SHO 120. Conversely, when an operation input for carrying out a data sync process has been received by the operation unit 360 in a state where the MCIM is invalid, the control unit 330 carries out control to transmit a data sync request via the RO 200 to the SHO 120. Note that such data sync request includes information (for example, terminal identification information) relating to the plurality of wireless communication apparatuses that will carry out the data sync process. The SHO 120 that has received the data sync request then transmits setting information (information for setting the temporary contract authentication information) to a wireless communication apparatus, out of such plurality of wireless communication apparatuses, where the MCIM is invalid.

Here, as described earlier, usage rights over the MCIM can be understood as "first connection rights" (network connection rights) and usage rights over the temporary contract authentication information can be understood as "second connection rights". That is, the control unit 330 transmits a setting request (a data sync request) that requests setting of the second connection rights in a wireless communication apparatus where the first connection rights are not set. The control unit 330 then carries out data communication with another wireless communication apparatus after the second connection rights have been set in accordance with such setting request.

More specifically, when the first connection rights are set in the first wireless communication apparatus 300, the control unit 330 transmits a setting request that requests setting of the second connection rights in another wireless communication apparatus (i.e., a wireless communication apparatus where the first connection rights have not been set). In this case, after a connection process based on the first connection rights, the control unit 330 carries out data communication with the other wireless communication apparatus where the second connection rights have been set.

Meanwhile, when the first connection rights are set in another wireless communication apparatus, the control unit 330 transmits a setting request requesting setting of the second connection rights in the first wireless communication apparatus 300. In this case, the control unit 330 carries out data communication with the other wireless communication apparatus after a connection process based on the second connection rights.

Also, when data communication carried out with the other wireless communication apparatus has ended, the control unit 330 clears the setting of the second connection rights.

Also, when an approval operation (for example, when the sync method "Premium" shown in FIG. 6 is selected) that approves billing for setting the second connection rights in a wireless communication apparatus where the first connection rights are not set has been received by the operation unit 360, the control unit 330 transmits a setting request. In this case, a billing process is carried out by the SHO 120 for the setting of the second connection rights.

The second connection rights can be understood as connection rights for carrying out communication relating to the data sync process as data communication. In this case, the control unit 330 carries out communication relating to the data sync process with another wireless communication apparatus after the second connection rights have been set in accordance with the setting request. Note that the control unit 330 is one example of the "control unit" referred to in the patent claims.

The operation unit 360 is an operation receiving unit receiving an operation input made by the user and outputs a signal in accordance with the received operation input to the control unit 330. The operation unit 360 includes various keys such as numeric keys and/or alphabet keys and receives an instruction operation (or "specified operation") made by the user who designates a group addition request. Note that the operation unit 360 is one example of the "receiving unit" referred to in the patent claims.

The display unit 370 is a display unit that displays various information (text information, time information, and the like) based on control by the control unit 330. As one example, the display unit 370 displays various information (for example, the display screens shown in FIG. 6) relating to a data sync setting. Note that as examples, it is possible to use a display panel such as an organic EL (Electro Luminescence) panel or an LCD (Liquid Crystal Display) panel. It is also possible to integrally construct the operation unit 360 and the display unit 370 using a touch panel that enables the user to make an operation input by touching or placing his/her finger close to a display screen.

The location information acquiring unit 380 acquires location information showing the location where the first wireless communication apparatus 300 is present and outputs the acquired location information to the control unit 330. As one example, the location information acquiring unit 380 can be realized by a GPS (Global Positioning System) unit that calculates the location information using GPS signals received by a GPS signal reception antenna (not shown). The calculated location information includes various data relating to location, such as latitude, longitude, and altitude, at the time the GPS signals were received. It is also possible to use a location information acquiring apparatus acquiring location information according to a different method of acquiring location information. For example, it is possible to derive location information using access point information according to a wireless Local Area Network (LAN) present in the periphery and to use a location information acquiring apparatus that acquires such location information.

f. Example Display of Data Sync Setting Screen

FIG. 6 is a diagram showing an example of a data sync setting screen displayed on the display unit 370 of the first wireless communication apparatus 300 according to the first exemplary embodiment.

A data sync setting screen 410 shown in FIG. 6 is a display screen for carrying out a setting operation relating to a data sync process between the first wireless communication apparatus 300 and another wireless communication apparatus in the group to which the first wireless communication apparatus 300 belongs. Also, based on the content of the group management database 220 shown in FIG. 4, the data sync setting screen 410 displays information (for example, the device names 224) relating to the group to which the first wireless communication apparatus 300 belongs. Note that it is assumed that the control unit 330 acquires the content of the group management database 220 from the RO 200 on a regular or an irregular basis.

The data sync setting screen 410 is provided with check boxes 411 to 414, radio buttons 415 and 416, a confirm button 417, and a return button 418. In the data sync setting screen 410, "Data to be synced", "Devices to be synced", and "Sync Method" are displayed as setting items for a data sync process and the settings of the data sync process are selected using the respective buttons.

The check boxes 411 and 412 are check boxes for selecting the "Data to be synced". When a check mark is added to the check box 411, "Address book" is selected as data (sync data) to be synced. Similarly, when a check mark is added to the check box 412, "Calendar" is selected as sync data.

The check boxes 413 and 414 are check boxes for selecting the "Devices to be synced". When a check mark is added to the check box 413, the second wireless communication apparatus 130 (with the device name "My E-book Reader") is selected as a device to be synced. Similarly, when a check mark is added to the check box 414, the third wireless communication apparatus 140 (with the device name "My Computer") is selected as a device to be synced. Note that in the first embodiment of the present disclosure, an example is shown where the wireless communication apparatuses that can be selected as the "Devices to be synced" item are the wireless communication apparatuses belonging to the same group. That is, two devices (the second wireless communication apparatus 130 and the third wireless communication apparatus 140) that compose the group AB to which the first wireless communication apparatus 300 belongs are displayed as the "Devices to be synced".

The radio buttons 415 and 416 are radio buttons for selecting the "Sync Method". When the radio button 415 is selected, "Free" is selected as the sync method and when the radio button 416 is selected, "Premium" is selected as the sync method. Note that regarding the radio buttons 415 and 416, when the data size of the data to be synced exceeds an upper limit (for example, 200 KB), the "Free" part may be grayed out so that only "Premium" can be selected.

The confirm button 417 is a button pressed when confirming the operation content after making the operations (selection operations) described above. That is, when the confirm button 417 is pressed after carrying out the selection operations described above, a data sync process (a sync process for the selected sync data) is carried out for the selected devices (the devices to be synced). This data sync process will be described in detail with reference to drawings such as FIGS. 9 and 10.

The return button 418 is a button pressed when returning to a display screen that was displayed immediately before the data sync setting screen 410, for example.

g. Example Display of Data Sync Result Screen

FIGS. 7(*a*) and 7(*b*) are diagrams showing examples of a data sync result screen which shows the result of a data sync process and is displayed on the display unit 370 of the first wireless communication apparatus 300 according to the first exemplary embodiment.

FIG. 7(*a*) shows a display screen (normal completion screen 420) displayed when the data sync process has been completed normally. This normal completion screen 420 is displayed on the display unit 370 after a sync completion notification (a notification that the syncing of data has been completed (shown in FIG. 10)) has been transmitted from the device selected as the "Device to be synced" in the data sync setting screen 410 shown in FIG. 6 to the first wireless communication apparatus 300. The normal completion screen 420 displays a message showing that the syncing of data has been completed, and is provided with a confirm button 421. The user presses the confirm button 421 after confirming the content of the message. After the confirm button 421 has been pressed, a specified display screen (for example, an initial screen) is displayed.

FIG. 7(*b*) shows a display screen (interruption screen 430) that is displayed when the data sync process is interrupted. The interruption screen 430 is displayed when the data sync process carried out with the device selected as the "Device to be synced" has been interrupted during execution for some reason. As one example, the interruption screen 430 is displayed when a sync completion notification (see FIG. 10) has not been transmitted from the other device in the data sync process before a specified period has elapsed. The interruption screen 430 is provided with a retry button 431 and a cancel button 432.

The retry button 431 is a button pressed when retrying the interrupted data sync process. When this retry button 431 is pressed, the temporary contract authentication information is set once again and the data sync process that was interrupted is carried out. However, if a usage limit (for example, a limit on the number of syncs (such as four times a day)) has been reached, the interrupted data sync process is not carried out.

The cancel button 432 is a button pressed when cancelling the data sync process. When the cancel button 432 is pressed, the data sync process ends with the data sync process in the interrupted state (i.e., in a state where the data sync has not been carried out).

h. Example Display of Number of Syncs Limit Reached Screen

FIG. 8 is a diagram showing one example of a number of syncs limit reached screen displayed on the display unit 370 of the first wireless communication apparatus 300 according to the first exemplary embodiment.

FIG. 8 shows a display screen (the number of syncs limit reached screen 440) displayed if it is not possible for the data sync process to start due to the limit on the number of syncs when a start instruction for the data sync process or a retry instruction for the data sync process is given. For example, when the first wireless communication apparatus 300 has transmitted a data sync request to the SHO 120, the control unit 125 of the SHO 120 determines whether the limit on the number of syncs has been reached. After this, if the number of times the first wireless communication apparatus 300 has transmitted a data sync request has reached the limit on the number of syncs, the control unit 125 determines that the data sync process is prohibited and transmits a prohibited notification to the first wireless communication apparatus 300. When the first wireless communication apparatus 300 has received this prohibited notification, the control unit 330 of the first wireless communication apparatus 300 displays the number of syncs limit reached screen 440 on the display unit 370. The number of syncs limit reached screen 440 displays a message showing that syncing is prohibited, and is provided with a confirm button 441. The confirm button 441 is a button pressed after the user has confirmed the message showing that syncing is prohibited.

i. Communication Example when Data Sync Process is Carried Out at a Plurality of Devices FIGS. 9 and 10 are sequence charts showing an example of the communication process carried out between the apparatuses that compose the communication system 100 according to the first exemplary embodiment.

FIGS. 9 and 10 show an imaginary case where a data sync process is carried out between the first wireless communication apparatus 300 and the second wireless communication apparatus 130. Note that it is assumed that a valid MCIM is stored in the first wireless communication apparatus 300. Also, in FIGS. 9 and 10, a case is imagined where the data to be synced has been updated at the first wireless communication apparatus 300.

Note that in FIGS. 9 and 10, a case is imagined where a setting operation for the data sync process is carried out at the first wireless communication apparatus 300 that stores a valid MCIM. A case where the setting operation for a data sync process is carried out at a wireless communication apparatus that does not store a valid MCIM will be described with reference to FIG. 14. Note that it is assumed that in FIGS. 9 and 10, the first wireless communication apparatus 300 is connected to the SHO 120 (step 501) and the second wireless communication apparatus 130 is connected to the RO 200 (step 502). Also, the third wireless communication apparatus 140 has been omitted from FIGS. 9 and 10.

First, at the first wireless communication apparatus 300, a data sync setting operation is carried out by way of a user operation (step 503). As one example, this data sync setting operation is carried out by the user setting the respective setting items in a state where the data sync setting screen 410 shown in FIG. 6 is displayed on the display unit 370 of the first wireless communication apparatus 300. After such setting operations have been made (i.e., a selection of the data to be synced ("Address book"), a selection of the device to be synced (My E-Book Reader (the second wireless communication apparatus 130)), and a selection of the sync method ("Free")), the confirm button 417 is pressed.

In this way, when a data sync setting operation has been carried out at the first wireless communication apparatus 300 (step 503), a data sync request is transmitted from the first wireless communication apparatus 300 to the SHO 120 (steps 504 and 505). This data sync request includes the various information set in the data sync setting screen 410 shown in FIG. 6 and also identification information (the terminal identification information stored in the memory 340) of the device where the data sync setting operation was carried out. As examples, the various information set in the data sync setting screen 410 is the data to be synced, the device to be synced, and the sync method. The terminal identification information (PCID #1) of the first wireless communication apparatus 300 is included as the identification information of the device where the data sync setting operation was made.

When a data sync request has been received by the SHO 120 (step 505), the control unit 125 of the SHO 120 transmits setting information via the RO 200 to the second wireless communication apparatus 130 based on the received data sync request (step 506). This setting information is information that sets temporary contract authentication information in the other device specified by the received data sync request (i.e., the device to be synced) and is information for syncing the data specified by the data sync request (i.e., the data selected in the data sync setting screen 410). Also, as described earlier, the second wireless communication apparatus 130 is connected to the RO 200 (step 502). For this reason, the setting information is transmitted from the SHO 120 via the RO 200 to the second wireless communication apparatus 130 (steps 506 to 509).

When the second wireless communication apparatus 130 has received the setting information (step 509), the control unit 330 of the second wireless communication apparatus 130 sets the temporary contract authentication information based on the received setting information (step 510). That is, the temporary contract authentication information included in the received setting information is written into the MCIM information storage unit 350 of the second wireless communication apparatus 130. By doing so, the temporary contract authentication information is set in the second wireless communication apparatus 130, which means that the second wireless communication apparatus 130 becomes capable of connecting to the SHO 120 based on the temporary contract authentication information (steps 511 and 512). For this reason, the second wireless communication apparatus 130 becomes connected to the SHO 120 with a connection based on the temporary contract authentication information (step 513).

When the second wireless communication apparatus 130 and the SHO 120 have become connected (step 513), a data sync process for syncing data between the first wireless communication apparatus 300 and the second wireless communication apparatus 130 is carried out.

For this data sync process, as one example a data sync process is carried out that syncs updated data produced by updating at the first wireless communication apparatus 300 in the second wireless communication apparatus 130 (see, for example, Japanese Laid-Open Patent Publication No. 2007-200522).

For example, a sync data transmission request that requests a start of transmission of sync data is transmitted to the SHO 120 from the second wireless communication apparatus 130 that has completed the connection process for connecting to the SHO 120 based on the temporary contract authentication information (steps 514 and 515). The data related to the sync data transmission request is specified by the received data sync request (e.g., "Data to be synced" and "Address book" that was selected in the data sync setting screen 410). After this, the SHO 120 that has received the sync data transmission request transmits the sync data transmission request to the transmission source of the data sync request (i.e., the first wireless communication apparatus 300) (steps 516 517).

After this, when the sync data transmission request has been received (step 517), the control unit 330 of the first wireless communication apparatus 300 extracts the updated data produced by the updating. As one example, a contact (for example, the contact inside the frame 304 in FIG. 2) that has been newly registered in the address book is extracted as the updated data. After this, the control unit 330 transmits the extracted updated data (difference data) as the sync data via the SHO 120 to the second wireless communication apparatus 130 (steps 518 to 521). Based on the sync data transmitted in this way, the second wireless communication apparatus 130 carries out the syncing of data by updating the data related to the data sync request (the data ("Data to be synced") selected in the data sync setting screen 410) (steps 518 to 521). Note that in cases such as where there is a plurality of data to be synced and/or the data size is large, the transmission and reception of the sync data (steps 514 to 521) are repeatedly carried out to complete the data sync process (500).

After the data sync process has been completed, a sync completion notification for notifying that the syncing of data has been completed is transmitted from the second wireless communication apparatus 130 via the SHO 120 to the first wireless communication apparatus 300 (steps 522 to 525). After this, the control unit 330 of the second wireless communication apparatus 130 carries out an invalidation process for invalidating the temporary contract authentication information (step 526). That is, the temporary contract authentication information written in the MCIM information storage unit 350 is deleted. After this, the second wireless communication apparatus 130 returns to being connected based on the PCID and becomes connected to the RO 200 (steps 527 to 528).

j. Example Operation of Wireless Communication Apparatus Transmitting Data Sync Request FIG. 11 is a flowchart showing an example of the processing procedures of the data sync process carried out by the first wireless communication apparatus 300 according to the first exemplary embodiment. FIG. 11 shows an example where the first wireless communication apparatus 300 that stores a valid MCIM transmits a data sync request.

First, the control unit 125 determines whether a data sync indicating operation for indicating the data sync process has been carried out (step S901) and if a data sync indicating operation has not been carried out, such monitoring is continued.

Meanwhile, when a data sync indicating operation has been carried out (step S901), the control unit 330 displays the data sync setting screen (for example, the data sync setting screen 410 shown in FIG. 6) on the display unit 370 (step S902). After this, the control unit 330 determines whether the return button has been pressed in the data sync setting screen (step S903) and if the return button has been pressed, the processing returns to step S901.

Meanwhile, when the return button has not been pressed (step S903), the control unit 330 determines whether all of the items (specified items) required when carrying out a data sync process have been set (step S904). If not all of the specified items have been set (step S904), the processing returns to step S902.

If all of the specified items have been set (step S904), the control unit 330 determines whether the confirm button has been pressed in the data sync setting screen (step S905). If the confirm button has not been pressed (step S905), the processing returns to step S902.

Meanwhile, if the confirm button has been pressed (step S905), the control unit 330 transmits a data sync request in accordance with the various items selected in the data sync setting screen to the SHO 120 (step S906).

After this, the control unit 330 determines whether a sync data transmission request has been received (step S907). Such sync data transmission request is transmitted via the SHO 120 from the other wireless communication apparatus carrying out the data sync process. If a sync data transmission request has not been received (step S907), the control unit 330 stands by until the sync data transmission request is received.

If a sync data transmission request has been received (step S907), the control unit 330 carries out the data sync process (step S908). After this, the control unit 330 determines whether a sync completion notification has been received (step S909) and if a sync completion notification has not been received (step S909), the processing returns to step S908 and the data sync process is repeated.

Meanwhile, when a sync completion notification has been received (step S909), operations in the data sync process are complete. Note that steps S907 to S909 are one example of the "control procedure" referred to in the patent claims.

k. Example Operation of Wireless Communication Apparatus that Carries Out Data Sync Process in Accordance With a Data Sync Request FIG. 12 is a flowchart showing one example of the processing procedures of the data sync process at the second wireless communication apparatus 130 according to the first embodiment of the present disclosure. FIG. 12 shows an example where the second wireless communication apparatus 130 that does not store a valid MCIM carries out the data sync process in accordance with a data sync request.

First, the control unit 330 determines whether setting information transmitted from the SHO 120 based on a data sync request has been received (step S920). If such setting information has not been received (step S920), the control unit 330 stands by until such setting information is received.

Meanwhile, when the setting information has been received (step S920), the control unit 330 sets the temporary contract authentication information based on the received setting information (step S921). After this, the control unit 330 carries out a connection process for connecting to the SHO 120 based on the set temporary contract authentication information (step S922). After this connection process, the control unit 330 transmits a sync data transmission request via the SHO 120 to the first wireless communication apparatus 300 (step S923).

Next, the control unit 330 carries out the data sync process with the first wireless communication apparatus 300 (step S924). After this, the control unit 330 determines whether the syncing of data has been completed (step S925) and if the syncing has not been completed the processing returns to step S924 and the data sync process is continued.

Meanwhile, when the syncing of data has been completed (step S925), a sync completion notification is transmitted via the SHO 120 to the first wireless communication apparatus 300 (step S926). After such transmission, the control unit 330 carries out an invalidation process for the temporary contract authentication information (step S927). Next, the control unit 330 carries out a connection process for connecting to the RO 200 based on a PCID, connects to the RO 200 (step S928), and ends the operations in the data sync process.

l. Example of Data Sync Process

FIGS. 13(a) and 13(b) are schematic diagrams respectively showing an example of a data sync process carried out by a different communication system and an example of a data sync process carried out by the communication system 100 using temporary contract authentication information according to the first exemplary embodiment.

FIG. 13(a) shows an example of a data sync process carried out by a different communication system. The communication system shown in FIG. 13(a) is composed of a first wireless communication apparatus 491, a second wireless communication apparatus 492, an SHO 493, and a sync data server 494. Note that in the example shown in FIG. 13(a), a case is imagined where one piece of contract authentication information is shared by the first wireless communication apparatus 491 and the second wireless communication apparatus 492 and the latest (i.e., most recent) data is stored in the first wireless communication apparatus 491. Also, a case where the first wireless communication apparatus 491 and the second wireless communication apparatus 492 are comparatively far apart is imagined.

Since one piece of contract authentication information is shared in the example shown in FIG. 13(a), it is not possible for both the first wireless communication apparatus 491 and the second wireless communication apparatus 492 to simultaneously connect to the SHO 493. For this reason, as one example a situation is imagined where a server (the sync data server 494) that functions as a temporary storage location for the sync data is provided and the data sync process is carried out by temporarily storing the data to be synced in the sync data server 494.

First, the first wireless communication apparatus 491 stores the sync data in the sync data server 494 by communicating (arrow 496) based on the contract authentication information. Next, the contract authentication information is transferred from the first wireless communication apparatus 491 to the second wireless communication apparatus 492 by way of a user operation. As examples, it is possible to transfer the contract authentication information by physically moving a card on which the contract authentication information is recorded or carrying out a transfer process for the contract authentication information via a wireless connection. After this, it is possible to sync the data by having the second wireless communication apparatus 492 acquire the sync data from the sync data server 494 by way of communication (arrow 499) based on the contract authentication information.

In this way, if the first wireless communication apparatus 491 and the second wireless communication apparatus 492 are comparatively far apart, when syncing data between such apparatuses, it is possible to sync the data by transferring the contract authentication information, for example. However, it is also conceivable that the user will not want to store personal data, such as an address book, on a server (the sync data server 494) present on a network. Also, when the contract authentication information is transferred, such transfer operation is complex, and during such transfer, the transfer source wireless communication apparatus (the first wireless communication apparatus 491) becomes unable to communicate based on the contract authentication information.

FIG. 13(b) shows one example of a data sync process carried out in the communication system 100 using temporary contract authentication information. In the communication system 100, since the temporary contract authentication information that can be used only when carrying out the data sync process is issued from the SHO 120, the first wireless communication apparatus 300 and the second wireless communication apparatus 130 are capable of simultaneously connecting to the SHO 120. For this reason, the first wireless communication apparatus 300 and the second wireless communication apparatus 130 are capable of directly transmitting and receiving data via the SHO 120.

That is, according to the first embodiment of the present disclosure, it is possible to carry out the data sync process without storing personal data such as an address book on a server present on a network. Also, since it is not necessary to transfer the contract authentication information even when the data sync process is carried out, there is no limit on communication by the first wireless communication apparatus 300 based on the contract authentication information. By using the contract authentication information (the temporary contract authentication information) that has been assigned certain limits over usage, it is also possible to reduce the fee charged to users. Also, by setting the temporary contract authentication information in a wireless communication apparatus that does not store a valid MCIM, it is possible to easily share the data used by a plurality of wireless communication apparatuses.

2. Second Exemplary Embodiment

In the first exemplary embodiment of the present disclosure, a case where the wireless communication apparatus that stores a valid MCIM (the first wireless communication apparatus 300) transmits a data sync request is described. However, it is also possible for a data sync request to be transmitted via the RO 200 from a wireless communication apparatus (for example, the second wireless communication apparatus 130) that does not store a valid MCIM.

For this reason, in this second embodiment of the present disclosure, an example of a data sync process carried out based on a data sync request transmitted by a wireless communication apparatus that does not store a valid MCIM is described with reference to FIGS. 14 and 15.

Note that since the example system configuration and the example internal configuration of a wireless communication apparatus in this second exemplary embodiment of the present disclosure are the same as the configurations shown in FIGS. 3 and 5, explanation thereof is omitted.

a. Example Communication When a Wireless Communication Apparatus that Does Not Store a Valid MCIM Transmits a Data Sync Request FIG. 14 is a sequence chart showing an example of a communication process carried out between the apparatuses that compose the communication system 100 according to the second exemplary embodiment. Note that the sequence chart shown in FIG. 14 is a modification to the sequence chart shown in FIG. 9 and differs in that a wireless communication apparatus that does not store a valid MCIM transmits a data sync request. For this reason, parts of FIG. 14 that are the same as FIG. 9 have been assigned the same reference numerals as in FIG. 9 and description thereof is omitted. Note that since the second half of the sequence chart shown in FIG. 14 (the part corresponding to FIG. 10) is the same as FIG. 10, such part has been omitted from the drawings and this description.

First, a data sync setting operation is carried out by way of a user operation at the second wireless communication apparatus 130 (step 531). Note that in the data sync setting screen 410 shown in FIG. 6, "My Mobile" (the first wireless communication apparatus 300) and "My Computer (the third wireless communication apparatus 140) are displayed as the "Devices to be synced". It is also assumed in this example that "My Mobile" (the first wireless communication apparatus 300) is selected. Aside from this, the data sync setting operation is substantially the same as the data sync setting operation (step 503) shown in FIG. 9.

After this, when the data sync setting operation has been made at the second wireless communication apparatus 130 (step 531), a data sync request is transmitted from the second wireless communication apparatus 130 via the RO 200 to the SHO 120 (steps 532 to 535). Note that such processes (steps 532 to 535) correspond to processes (steps 504 and 505) shown in FIG. 9. However, as described earlier, since the second wireless communication apparatus 130 is connected to the RO 200 (step 502), the processing differs in that the data sync request is transmitted via the RO 200 to the SHO 120.

When the SHO 120 has received the data sync request (step 535), the control unit 125 of the SHO 120 transmits the setting information via the RO 200 to the second wireless communication apparatus 130 based on the received data sync request (step 506). Note that since the processing is the same as in FIGS. 9 and 10 aside from the transmission process (steps 506 to 509) of the setting information carried out by the SHO 120, explanation thereof is omitted.

b. Example Operation of Wireless Communication Apparatus Transmitting a Data Sync Request FIG. 15 is a flowchart showing one example of processing procedures of a data sync process carried out by the second wireless communication apparatus 130 according to the second exemplary embodiment. FIG. 15 shows an example where the second wireless communication apparatus 130 that does not store a valid MCIM transmits a data sync request.

Note that FIG. 15 is a modification to the processing procedures shown in FIGS. 11 and 12 and differs in that the wireless communication apparatus that transmits the data sync request and the wireless communication apparatus where the temporary contract authentication information is set are the same apparatus (the second wireless communication apparatus 130).

That is, the second wireless communication apparatus 130 carries out the various processing procedures shown in FIG. 11 (step S901 to S906) before carrying out the various processing procedures shown in FIG. 12 (step S920 to S928). In FIG. 15, steps S931 to S936 are shown as processing procedures corresponding to the processing procedures (steps S901 to S906) shown in FIG. 11. Also, in FIG. 15, the processing procedures that correspond to the processing procedures (steps S920 to S928) shown in FIG. 12 have been assigned the same reference numerals and description thereof is omitted.

In this way, according to the second embodiment of the present disclosure, it is possible to carry out the data sync setting operation at a wireless communication apparatus that does not store a valid MCIM. By doing so, since it is possible to carry out the data sync setting operation regardless of whether a valid MCIM is stored, it is possible to carry out the data sync process at timing desired by the user.

3. Third Exemplary Embodiment

In the first and second exemplary embodiments of the present disclosure, examples of data sync processes carried out when "Free" is selected as the sync method are described. However, a case can also be imagined where even though "Free" has been selected as the sync method, one or more values relating to the data sync process (such as the size of the communication data and a time limit) exceeds a set value (an upper limit for "Free"). In such a situation, it can be imagined that some users would like to continue the data sync process by paying an additional fee for only the part of the operation that exceeds the set value.

For this reason, in this third embodiment of the present disclosure, an example where billing related to the data sync process is carried out as appropriate will be explained with reference to FIGS. 16 and 17.

Note that since the example system configuration and the example internal configuration of a wireless communication apparatus in the third embodiment of the present disclosure are the same as the configurations shown in FIGS. 3 and 5, description thereof is omitted here.

a. Example Display of Billing Notification Screen

FIG. 16 is a diagram showing an example of a billing notification screen displayed on the display unit 370 of the first wireless communication apparatus 300 according to the third exemplary embodiment.

If, during execution of the data sync process, an item which relates to the data sync process and is subject to a limit (such as a limit on the number of syncs, a limit on data size, or a limit on time) exceeds a set value (an upper limit for "Free"), the display screen (the billing notification screen 460) shown in FIG. 16 displaying a notification message or the like indicating that the limit has been exceeded is displayed. As one example, the billing notification screen 460 is displayed when, during the data sync process, the size of the sync data related to the data sync process has exceeded a set value (the communication data size). The billing notification screen 460 includes a continue button 461 and a cancel button 462.

The continue button 461 is a button pressed when paying an additional fee to continue the data sync process. When this continue button 461 is pressed, the data sync process is continued and a billing process is carried out at the SHO 120.

The cancel button 462 is a button pressed when the data sync process is cancelled. That is, when the cancel button 462 is pressed, the present data sync process is cancelled. In this case, the data sync process being carried out in accordance with the data sync setting operation ends without data being synced between the plurality of wireless communication apparatuses.

In this way, if, during execution of the data sync process, an item that relates to the data sync process and is subject to a limit has reached a set value, the billing notification screen 460 is displayed and it becomes possible for the user to confirm whether an additional fee will be paid to continue the data sync process. By doing so, it is possible to carry out appropriate billing in keeping with the data sync process.

b. Example Operation Relating to Billing Process by SHO

FIG. 17 is a flowchart showing an example of processing procedures of a billing process by the SHO 120 according to the third exemplary embodiment. In the example shown in FIG. 17, although "Free" was selected as the sync method, the limit on the data size or the limit on time for the data sync process has been exceeded and billing is carried out for the excess part.

First, the control unit 125 determines whether a data sync request has been received (step S941). Here, if a data sync request has not been received (step S941), the control unit 125 stands by until a data sync request is received Meanwhile, if a data sync request has been received (step S941), the control unit 125 determines whether the sync method included in the data sync request is "Premium" (step S942). If the sync method is not "Premium" (that is, if the sync method is "Free") (step S942), the control unit 125 transmits the setting information relating to this sync method ("Free") to the wireless communication apparatus (the "Device to be synced") specified by the data sync request (step S943). Here, the setting information relating to the sync method ("Free") is setting information for setting temporary contract authentication information with limits relating to the sync method ("Free").

After this, the control unit 125 determines whether the data sync process has started (step S944). If the data sync process has not started (step S944), the control unit 125 stands by until the data sync process starts. Here, it is possible to determine whether the data sync process has started based on whether a sync data transmission request has been received.

Meanwhile when the data sync process has started (step S944), the control unit 125 determines whether the communication data size of the data sync process that has started has reached a size limit (a limit data size) (step S945). Here, if the limit data size has been reached (step S945), the processing proceeds to step S950.

If the limit data size has not been reached (step S945), the control unit 125 determines whether the use time (for example, the time elapsed from the start) of the temporary contract authentication information used in the started data sync process has reached a time limit (step S946). If the use time has reached the time limit (step S946), the processing proceeds to step S950.

If the use time has not reached the time limit (step S946), the control unit 125 determines whether a sync completion notification (a notification showing that the data sync process has been completed) has been received (step S947) and ends operations in the billing process if the sync completion notification has been received. Meanwhile, if a sync completion notification has not been received (step S947), the processing returns to step S945.

Also, if the sync method included in the data sync request is "Premium" (step S942), the control unit 125 transmits setting information relating to the sync method ("Premium") to the wireless communication apparatus (the "Device to be synced") specified by the data sync request (step S948). Here, the setting information relating to the sync method ("Premium") is setting information for setting temporary contract authentication information with limits relating to the sync method ("Premium").

Next, the control unit 125 determines whether the data sync process has started (step S949). If the data sync process has not started (step S949), the control unit 125 stands by until the data sync process starts.

Meanwhile, if the data sync process has started (step S949), the control unit 125 determines whether a sync completion notification (a notification showing that the data sync process has been completed) has been received (step S950). If a sync completion notification has been received (step S950), the control unit 125 carries out a billing process relating to the data sync process (step S951). For example, when the sync method is "Free", if the communication data size of the data sync process and/or the usage time of the temporary contract authentication information used in the data sync process exceeds a set value, billing is carried out for the part that exceeds such set value. Also, as one example, when the sync method is "Premium", billing for a fee set in advance (a fixed fee, or a variable fee depending on usage) is carried out. After the billing process has been carried out (step S951), the operations in the billing process end.

Note that in this example, billing is carried out automatically when one of the various values (the communication data size and/or time limit) relating to the data sync process has reached the set value. However, when one of the various values (the communication data size and/or time limit) relating to the data sync process has reached the set value, it is possible to carry out billing on condition that a confirmation operation by the user has been carried out. For example, the control unit 125 may have a notification screen (for example, the billing notification screen 460 shown in FIG. 16) notifying that a value relating to the data sync process has reached a set value displayed by a wireless communication apparatus. After this, the control unit 125 may carry out billing on the condition that a confirmation operation by the user (for example a pressing operation of the continue button 461 shown in FIG. 16) has been carried out in the notification screen.

In this way, the control unit 125 carries out a billing process for the setting of the second connection rights when, after the setting of the second connection rights in accordance with a data sync request (a setting request), a value relating to data communication has become large relative to a set value relating to a specified limit.

That is, according to the third embodiment of the present disclosure, when a data sync process is carried out using temporary contract authentication information, it is possible to carry out appropriate billing in keeping with values relating to the data sync process.

4. Fourth Exemplary Embodiment

In the first to third exemplary embodiments, examples are described where a data sync process is carried out based on a user operation. That is, in the first to third embodiments of the present disclosure, examples are described where a data sync process is carried out at timing desired by the user. Here, when the data to be synced is decided in advance, it would also be conceivable to automatically carry out the data sync process every time such data is updated.

For this reason, in the fourth embodiment of the present disclosure, an example of where the data sync process is carried out automatically every time the data to be synced is updated will be described with reference to FIGS. 18 to 20.

Also, in this fourth embodiment of the present disclosure, an example will be described with a calendar as the data to be synced.

In the first to third exemplary embodiments, examples are described where sync data is directly transmitted to the other party (wireless communication apparatus) carrying out the data sync process. However, it is also possible to carry out the data sync process via another apparatus (for example, a sync data server) on a network. In this case, by carrying out a data sync process using temporary contract authentication information, it is possible to carry out the data sync process more easily than when the data sync process is carried out after transferring contract authentication information (as in the communication system shown in FIG. 13(*a*), for example). For this reason, in the fourth embodiment of the present disclosure, an example of where the data sync process is carried out via a sync data server is described.

a. Example Configuration of Communication System

FIG. 18 is a block diagram showing an example of the system configuration of a communication system 700 according to the fourth exemplary embodiment.

Note that the communication system 700 is a modification to the communication system 100 shown in FIG. 3 and differs due to the addition of a sync data server 710. That is, since the configuration aside from the sync data server 710 is the same as in FIG. 3, such parts that are the same as FIG. 3 have been assigned the same reference numerals and description thereof is omitted.

The sync data server 710 is a server that functions as a temporary storage location for sync data and is assumed to be the same as the sync data server 494 shown in FIG. 13(*a*). For this reason, detailed description is omitted. The sync data server 710 stores sync data transmitted from a wireless communication apparatus connected to the SHO 120. The sync data server 710 also transmits the stored sync data to a wireless communication apparatus connected to the SHO 120. That is, the sync data server 710 transmits and receives the sync data to and from wireless communication apparatuses connected to the SHO 120 using contract authentication information or temporary contract authentication information.

b. Example Communication When the Data Sync Process is Carried Out Automatically FIGS. 19 and 20 are sequence charts showing an example of the communication process carried out between the apparatuses that compose the communication system 700 according to the fourth exemplary embodiment.

Note that the sequence charts shown in FIGS. 19 and 20 are modifications to the sequence charts shown in FIGS. 9 and 10. That is, the sequence charts shown in FIGS. 19 and 20 differ to the sequence charts shown in FIGS. 9 and 10 in that the sync data is automatically registered in the sync data server 710 and that the sync data is transmitted from the sync data server 710. For this reason, in FIGS. 19 and 20, parts that are the same as in FIGS. 9 and 10 have been assigned the same reference numerals as in FIGS. 9 and 10 and description thereof is omitted.

First, the data to be synced (i.e., the calendar) is updated at a wireless communication apparatus that stores a valid MCIM (the first wireless communication apparatus 300) (step 551). Once the calendar updating process has been carried out in this way (step 551), sync data relating to the updated content is transmitted from the first wireless communication apparatus 300 to the sync data server 710 (step 552). In this case, terminal specifying information (for example, terminal identification information) for specifying the transmission source and the wireless communication apparatus to be synced is transmitted together with the sync data via the SHO 120 to the sync data server 710 (steps 552 to 555). The sync data transmitted in this way is stored in the sync data server 710 (step 556). In this case, the terminal specifying information is stored in association with the sync data in the sync data server 710.

Here, if the data to be synced (i.e., the calendar) has been updated (step 551), it is possible to display a confirmation screen for enabling the user to confirm whether the data sync process is to be carried out automatically on the display unit 370 of the first wireless communication apparatus 300. In such case, the first wireless communication apparatus 300 transmits sync data relating to the updated content to the sync data server 710 (step 552) on condition that a user operation (for example, a pressing operation of a confirm button on such confirmation screen) indicating that the data sync process is to be carried out automatically has been made.

After the sync data has been transmitted (step 552), a data sync request is transmitted to the SHO 120 from the first wireless communication apparatus 300 (steps 557 and 558). That is, the data sync process is started automatically. Note that since the various processes (steps 506 to 513) carried out after the data sync request has been received at the SHO 120 (step 558) correspond to the processes (steps 506 to 513) shown in FIG. 9, description thereof is omitted.

Next, in the data sync process (step 560), a sync data transmission request from the second wireless communication apparatus 130 that has completed the connection process for connecting to the SHO 120 based on the temporary contract authentication information is transmitted via the RO 200 to the sync data server 710 (steps 561 to 564). The sync data transmission request requests a start of transmission of the sync data.

When the sync data transmission request has been received (step 564), the sync data server 710 transmits the sync data via the SHO 120 to the second wireless communication apparatus 130 (steps 565 to 568). In this case, the sync data stored in association with the wireless communication apparatus (the second wireless communication apparatus 130) that transmitted the sync data transmission request is transmitted to such wireless communication apparatus. Note that it is assumed that the processes (steps 522 to 529) after the data sync process (step 560) are the same as the processes (steps 522 to 529) shown in FIG. 10. For this reason, the same reference numerals have been assigned and description thereof is omitted.

In this way, every time the content (for example, the calendar) subjected to the data sync process is updated, the control unit 330 transmits a data sync request (setting request) for syncing the content related to the updating.

That is, according to the fourth exemplary embodiment, it is possible to automatically carry out the data sync process every time the content to be synced is updated. It is also possible to automatically carry out a data sync process via another apparatus (for example, a sync data server) on a network. That is, the data sync process can be carried out easily even if the user does not carry out an operation for the data sync process.

5. Fifth Exemplary Embodiment

In the first to fourth exemplary embodiments, examples are described where communication relating to a data sync process is carried out by setting temporary contract authentication information in a wireless communication apparatus that does not store a valid MCIM. Here, it is possible for a wireless communication apparatus that does not store a valid MCIM to connect to an RO via a connection based on the PCID and to carry out transmission and reception of data to and from the RO. This means it would be conceivable to transmit and receive sync data between the SHO and the RO and to also transmit and receive sync data from the RO to a wireless communication apparatus. In this case, it is possible to carry out a data sync process even without using temporary contract authentication information.

For this reason, in the fifth exemplary embodiment, an example where the data sync process is carried out using a connection based on a PCID will be described with reference to FIGS. 21 to 23.

Note that since the example system configuration and the example internal configuration of a wireless communication apparatus according to the fifth embodiment of the present disclosure are substantially the same as the configurations shown in FIGS. 3 and 5, the description will focus on the differences.

a. Example of Data Sync Process

FIG. 21 is a schematic diagram showing an example of a data sync process which uses a connection based on a PCID and is carried out by a communication system 800 according to a fifth exemplary embodiment.

Note that in FIG. 21, a case is imagined where the first wireless communication apparatus 300 stores a valid MCIM but the second wireless communication apparatus 130 does not store a valid MCIM.

FIG. 21 shows only the first wireless communication apparatus 300, the second wireless communication apparatus 130, the SHO 120, and the RO 200 as the communication system 800 and other structural elements are omitted from the drawing. Here, a connection path 801 for exchanging control signals is provided between the SHO 120 and the RO 200. For this reason, according to the fifth embodiment of the present disclosure, an example is shown where the connection path 801 between the SHO 120 and the RO 200 is used in the data sync process between a plurality of wireless communication apparatuses. In this case, since communication is possible even when the plurality of wireless communication apparatuses are connected to the SHO 120 and the RO 200, it is not necessary to set temporary contract authentication information in a wireless communication apparatus that does not store a valid MCIM.

However, the connection path 801 between the SHO 120 and the RO 200 has a main object of handling control signals. For this reason, it can be imagined that there will be certain limits when the connection path 801 is used in a data sync process between a plurality of wireless communication apparatuses. As examples, it would be possible to reduce the data size handled when "Free" has been selected as the sync method (the "Sync method" in the data sync setting screen 410 shown in FIG. 6) and to increase the fee setting when "Premium" has been selected as the sync method. On the other hand, since transmission of temporary contract authentication information is unnecessary, it would be possible to reduce the time taken due to the data sync process. As examples, downloading the temporary contract authentication information is comparatively time-consuming and it is necessary to carry out an invalidation process for the temporary contract authentication information and to connect to the RO once the data sync process has been completed. This means that by making transmission of the temporary contract authentication information used in the data sync process unnecessary, it is possible to reduce the time taken due to the data sync process.

As one example, a case is imagined where the first wireless communication apparatus 300 is connected to the SHO 120 based on a valid MCIM and the second wireless communication apparatus 130 is connected to the RO 200 based on the PCID. In such case, when a data sync process (the dotted arrow 802 shown in FIG. 21) is carried out between the first wireless communication apparatus 300 and the second wireless communication apparatus 130, the connection path 801 between the SHO 120 and the RO 200 is used. For example, the sync data transmitted by the first wireless communication apparatus 300 is supplied via the SHO 120 and the RO 200 to the second wireless communication apparatus 130.

In this way, it is possible to transmit and receive sync data between the first wireless communication apparatus 300 and the second wireless communication apparatus 130 via the connection path 801 between the SHO 120 and the RO 200. In this case, it is possible to supply sync data to a wireless communication apparatus that does not store a valid MCIM without using temporary contract authentication information.

Next, a sequence chart showing an example communication process carried out between the respective apparatuses that compose the communication system according to the fifth embodiment of the present disclosure will be described with reference to FIGS. 22 and 23.

b. Example Communication in a Case Where a Data Sync Process is Carried Out Via Connection Based on a PCID FIGS. 22 and 23 are sequence charts showing an example of the communication process carried out between the apparatuses that compose the communication system according to the fifth exemplary embodiment.

Note that the sequence charts shown in FIGS. 22 and 23 are modifications to the sequence charts shown in FIGS. 9 and 10. For this reason, parts that are the same as in FIGS. 9 and 10 have been assigned the same reference numerals as in FIGS. 9 and 10, description thereof is omitted, and the description will focus on the differences with FIGS. 9 and 10.

When a data sync request transmitted by the first wireless communication apparatus 300 is received (step 505), the control unit 125 of the SHO 120 transmits a connection use request to the RO 200 (step 571). Such connection use request is a request to use the connection (the connection path 801) between the SHO 120 and the RO 200 for the data sync process.

When the connection use request has been received (step 572), the control unit 210 of the RO 200 sets the connection (the connection path 801) between the SHO 120 and the RO 200 based on the connection use request so that transmission and reception of sync data is possible (step 573). By doing so, the RO 200 becomes connected so that the transmission and reception of sync data to and from the SHO 120 is possible (step 574). That is, the connection (the connection path 801) between the SHO 120 and the RO 200 is placed in a connection state where the transmission and reception of sync data is possible (step 574).

In this connection state (step 574), the data sync process (step 586) is carried out between the first wireless communication apparatus 300 and the second wireless communication apparatus 130.

In the data sync process (step 586), as one example, the sync data transmission request is transmitted from the second wireless communication apparatus 130 to the RO 200 (steps 577 and 578). The RO 200 that has received the sync data transmission request then transmits this sync data transmission request to the SHO 120 (steps 579 and 580).

Next, in the same way as FIG. 10, the SHO 120 that has received the sync data transmission request transmits the sync data transmission request to the transmission source of the data sync request (i.e., the first wireless communication apparatus 300) (516, 517).

When the SHO 120 has received the sync data transmitted by the first wireless communication apparatus 300 (step 519), the sync data is transmitted via the RO 200 to the second wireless communication apparatus 130 (steps 581 to 584).

After this, when the data sync process (step 586) has ended, a sync completion notification for notifying that the data sync process has been completed is transmitted from the second wireless communication apparatus 130 to the first wireless communication apparatus 300 (steps 591 to 594, 524, and 525). Note that in the transmission process, the sync completion notification is transmitted from the second wireless communication apparatus 130 to the RO 200 (steps 591 and 592) and is then transmitted from the RO 200 to the SHO 120 (steps 593 and 594). After this, the sync completion notification is transmitted from the SHO 120 to the first wireless communication apparatus 300 (steps 524 and 525).

When the SHO 120 has received the sync completion notification (step 594), a connection use stopping request is transmitted from the SHO 120 to the RO 200 (steps 595 and 596). The connection use stopping request is a request for ending use of the connection (the connection path 801) between the SHO 120 and the RO 200 for the data sync process. After this, a setting for stopping use of the connection (the connection path 801) between the SHO 120 and the RO 200 for the data sync process is made (step 597) based on the connection use stopping request.

In this way, according to the fifth exemplary embodiment of the present disclosure, it is possible to transmit and receive the sync data between the first wireless communication apparatus 300 and the second wireless communication apparatus 130 using the connection path 801 between the SHO 120 and the RO 200. In this case, even if temporary contract authentication information is not used, it is possible to carry out a data sync process with a wireless communication apparatus that does not store a valid MCIM using a connection based on a PCID.

6. Sixth Exemplary Embodiment

In the first to fifth exemplary embodiments, examples are described where a data sync process is carried out between two wireless communication apparatuses (the first wireless communication apparatus 300 and the second wireless communication apparatus 130). However, the present disclosure is not limited to this and can also be applied to a case where a data sync process is carried out between three or more wireless communication apparatuses.

For this reason, in the sixth embodiment of the present disclosure, an example of a data sync process carried out between three wireless communication apparatuses is described with reference to FIGS. 24 to 26.

a. Example Communication When a Data Sync Process is Carried Out Between a Plurality of Devices FIGS. 24 to 26 are sequence charts showing an example of a communication process carried out between the apparatuses that compose a communication system according to the sixth exemplary embodiment.

Note that the sequence charts shown in FIGS. 24 to 26 are modifications to the sequence charts shown in FIGS. 9 and 10. That is, the sequence charts shown in FIGS. 24 to 26 differ by including the various processes of the data sync process relating to the third wireless communication apparatus 140 in addition to the various processes of the sequence charts shown in FIGS. 9 and 10. For this reason, in FIGS. 24 to 26, parts that are the same as in FIGS. 9 and 10 have been assigned the same reference numerals as FIGS. 9 and 10 and description thereof is omitted.

Note that in FIGS. 24 to 26, a case is imagined where the first wireless communication apparatus 300 stores a valid MCIM and the second wireless communication apparatus 130 and the third wireless communication apparatus 140 do not store a valid MCIM. Also, in the same way as in the first embodiment of the present disclosure, it is imagined that the first wireless communication apparatus 300 transmits a data sync request. However, in this example, it is imagined that in the data sync request, the second wireless communication apparatus 130 and the third wireless communication apparatus 140 are selected as the devices to be synced.

When the SHO 120 has received the data sync request (step 505), the control unit 125 of the SHO 120 transmits the setting information via the RO 200 to the second wireless communication apparatus 130 based on the received data sync request (steps 506 to 509). The control unit 125 of the SHO 120 also transmits the setting information via the RO 200 to the third wireless communication apparatus 140 based on the received data sync request (steps 602 to 605). Note that the various processes (602 to 609) from the transmission process of the setting information to the third wireless communication apparatus 140 to the state where the third wireless communication apparatus 140 and the SHO 120 are connected correspond to the processes (steps 506 to 513) relating to the second wireless communication apparatus 130. For this reason, description of such processes is omitted.

Also, in the data sync process (step 620), based on the sync data transmission request transmitted by the third wireless communication apparatus 140 (steps 611 to 614), the sync data is transmitted from the second wireless communication apparatus 130 to the third wireless communication apparatus 140 (steps 615 to 618). After the data sync process (step 620), a sync completion notification is transmitted from the third wireless communication apparatus 140 via the SHO 120 to the first wireless communication apparatus 300 (steps 622 to 625). An invalidation process is also carried out on the temporary contract authentication information set in the third wireless communication apparatus 140 (step 626) and the third wireless communication apparatus 140 becomes connected to the RO 200 (steps 627 to 629). Note that the various processes (steps 611 to 618) relating to the transmission of sync data related to the third wireless communication apparatus 140 correspond to the various processes (steps 514 to 521) relating to the second wireless communication apparatus 130. Also, the various processes (steps 622 to 629) relating to connecting the third wireless communication apparatus 140 to the RO 200 correspond to the various processes (steps 522 to 529) relating to the second wireless communication apparatus 130.

Note that although an example where the data sync process is carried out between three wireless communication apparatuses has been described in this embodiment, it is also possible to apply the present disclosure to a data sync process carried out between four or more wireless communication apparatuses.

In this way, according to the sixth exemplary embodiment, for a data sync process carried out between a plurality of wireless communication apparatuses, it is possible to carry out the data sync process appropriately by setting temporary contract authentication information in the wireless communication apparatuses that do not store a valid MCIM.

In this way, according to the exemplary embodiments, data used by a plurality of wireless communication apparatuses (as examples, content such as an address book or a calendar) can be shared easily by a plurality of wireless communication apparatuses.

Note that in the exemplary embodiments, examples are described where information processing apparatuses (such as the SHO 120, the RO 200, and the sync data server 710) are configured as single devices. However, it is also possible to apply the exemplary embodiments to an information processing system where the various units that construct such information processing apparatuses (as examples, the control unit 210 and the group management database 220) are constructed of a plurality of apparatuses. Also, in the exemplary embodiments, although the group AB composed of three wireless communication apparatuses has been described as an example, it is also possible to apply the exemplary embodiments to groups composed of two or four or more wireless communication apparatuses. Also, in the exemplary embodiments, a case where a data sync process is carried out between a plurality of wireless communication apparatuses that compose a group has been described. However, it is also possible to apply the exemplary embodiments when carrying out a data sync process between a plurality of wireless communication apparatuses that do not compose a group. In this case, as one example, it is possible to set the other party to carry out the data sync process according to a user operation (for example, an input operation for identification information that identifies the other wireless communication apparatus).

It is also possible to apply the exemplary embodiments to mobile wireless communication apparatuses (for example a dedicated data communication terminal apparatus) or fixed-type wireless communication apparatuses (for example, a wireless communication apparatus for data collection at a vending machine). It is also possible to apply the exemplary embodiments to a case where a data sync process is carried out for content (for example a playlist (music, photographs, or the like) aside from an address book and a calendar.

Examples where use rights over an MCIM are used as network connection rights are described above in the exemplary embodiments. However, it is also possible to apply the exemplary embodiments to other network connection rights for connecting to a specified network based on other information (for example, a USIM (Universal Subscriber Identity Module)). In such case, as the temporary contract authentication information, it is possible to use connection rights (connection rights for carrying out data communication) that are more limited than other network connection rights (the first connection rights) as the second connection rights.

Note that the exemplary embodiments outlined above describe examples used to embody the present disclosure and that elements in the embodiments correspond to elements in the patent claims. In the same way, elements in the patent claims correspond to elements in the embodiments of the present disclosure that have been given the same names. However, it should be understood by those skilled in the art that various modifications, combinations, sub-combinations and alterations may occur depending on design requirements and other factors insofar as they are within the scope of the appended claims or the equivalents thereof.

The processing procedures described in the embodiments given above may take the form of a method including a series of such procedures and may also take the form of a computer programs and sets of instructions can be stored within one or more computer-readable media. Additionally or alternatively, computer programs and sets of instructions may also be received via a communications interface and stored on the one or more computer-readable media. Examples of such computer-readable media include, but are not limited to, random access memory (RAM), read-only memory (ROM), and various tangible, non-transitory computer-readable media such as hard disks, flash memory, compact discs (CDs), minidisks (MDs), a DVD (Digital Versatile Disc), a memory card, a Blu-ray Disc (registered trademark) or the like.

Such computer programs and instructions, when executed by at least one processor of a disclosed information processing apparatus (e.g., the SHO, the RO, one or more of the wireless communications devices, or the group management server) enable the at least one processor to perform the computer-implemented methods described herein. Examples of program instructions include, for example, machine code, such as code produced by a compiler, and files containing a high-level code that can be executed by the processor using an interpreter.

Additionally, the present technology may also be configured as below.

(1)
A communications apparatus comprising a control circuit, the control circuit being configured to:
  establish, through an information processing apparatus, a communications session with an additional communications apparatus associated with one or more first connection rights, the established communications session being associated with one or more second connection rights that differ from the first connection rights;
  generate an instruction to transmit data in accordance with the second connection rights.

(2)
The communications apparatus of (1), further comprising a transmission unit configured to transmit the data in accordance with the generated instruction.

(3)
The communications apparatus of (1) or (2), further comprising a receiving unit configured to receive information identifying the one or more second connection rights from the information processing apparatus.

(4)
The communications apparatus of (3), wherein the control circuit is configured to establish the communications session in response to the received information.

(5)
The communications apparatus of (3) or (4), wherein the second connection rights define one or more second session parameters associated with the established communications session.

(6)
The communications apparatus of (5), wherein the second session parameters comprise at least one of (i) a duration of the established communication session, (ii) a type of data processing available during the established communications session, (iii) an amount of data transferrable during the established communications sessions, or (iv) a number of communications sessions established between the information processing apparatus and the communications apparatus.

(7)
The communications apparatus of (5) or (6), wherein:
  the first connection rights define one or more first session parameters of a communications session established between the information processing apparatus and the additional communications apparatus; and
  the second session parameters comprise a subset of the first session parameters.

(8)
The communications apparatus of any one of (3) to (7), further comprising a storage unit configured to store at least one of data associated with an electronic address book or data associated with an electronic calendar.

(9)
The communications apparatus of (8), wherein the storage unit is further configured to store the one or more second connection rights.

(10)
The communications apparatus of (8) or (9), wherein the control circuit is further configured to generate an instruction to transmit, to the information processing apparatus, a request to synchronize at least a portion of the stored data with the additional communications apparatus.

(11)
The communication apparatus of (9), wherein the request comprises at least one of information identifying the additional communications apparatus or information associated with the stored data portion.

(12)
The communication apparatus of (11), wherein the receiving unit is further configured to receive a response to the transmitted request, the response being generated by the additional communications apparatus and transmitted through the information processing apparatus.

(13)
The communications apparatus of (12), wherein the response comprises data from the additional communications apparatus that corresponds to the stored data portion.

(14)
The communications apparatus of (13), wherein the control circuit is further configured to synchronize the stored data portion with the data received from the additional communications apparatus.

(15)
The communications apparatus of (14), wherein the control circuit is further configured to generate an instruction to transmit, in accordance with the second connection rights, information indicative of a successful data synchronization to the information processing apparatus

(16)
The communications apparatus of any one of (3) to (16), wherein the control circuit is further configured to determine that the at least one of the second connection rights are invalid.

(17)
The communications apparatus of (16), wherein:
  the second connection rights are associated with a period of temporal validity; and
  the control circuit is further configured to determine that the second connection rights are invalid, upon expiration of the temporal validity period.

REFERENCE SYMBOLS

100, 700, 800 Communication system
110 Public network

120 SHO
121, 122, 206 Base station
125 Control unit
130 Second wireless communication apparatus
140 Third wireless communication apparatus
200 RO
205 Communication unit
210 Control unit
220 Group management database
300 First wireless communication apparatus
311 Antenna
312 Antenna sharing unit
321 Modulating unit
322 Demodulating unit
330 Control unit
331 Bus
340 Memory
350 MCIM information storage unit
360 Operation unit
370 Display unit
380 Location information acquiring unit
391 Microphone
392 Speaker
710 Sync data server

What is claimed is:

1. A first communication apparatus, comprising:
a storage configured to store at least one of data associated with an electronic address book or data associated with an electronic calendar; and
a control circuit configured to:
 establish, through an information processing apparatus, a first communication session with a second communication apparatus, wherein
  the second communication apparatus is associated with at least one first connection right, and
  the first communication apparatus is different from the information processing apparatus;
 receive first information that identifies at least one second connection right from the information processing apparatus;
 establish, through the information processing apparatus, a second communication session associated with the at least one second connection right that differs from the at least one first connection right;
 control transmission, to the information processing apparatus, of a request to synchronize at least a specific portion of the stored data with the second communication apparatus, wherein
  the request indicates the at least the specific portion of the stored data, and
  the request comprises second information that identifies the second communication apparatus;
 receive, through the information processing apparatus, a response to the transmitted request from the second communication apparatus, wherein
  the response is generated by the second communication apparatus, and
  the response comprises response data corresponding to the at least the specific portion of the stored data;
 synchronize the at least the specific portion of the stored data with the response data; and
 control transmission of third information, indicative of a successful data synchronization, to the information processing apparatus based on the at least one second connection right.

2. The first communication apparatus of claim 1, further comprising a receiving circuit configured to receive fourth information from the information processing apparatus, wherein
 the at least one second connection right is identified from the received fourth information.

3. The first communication apparatus of claim 2, wherein the control circuit is further configured to establish the first communication session based on the received fourth information.

4. The first communication apparatus of claim 2, wherein
 the control circuit is further configured to determine a plurality of first session parameters associated with the established first communication session, and
 the plurality of first session parameters is determined based on the at least one second connection right.

5. The first communication apparatus of claim 4, wherein
 the plurality of first session parameters comprises at least one of
  a duration of the established first communication session,
  a type of data processing available during the established first communication session,
  an amount of the stored data transferable during the established first communication session, or
  a number of second communication sessions established between the information processing apparatus and the first communication apparatus.

6. The first communication apparatus of claim 4, wherein
 a plurality of second session parameters of a third communication session established between the information processing apparatus and the second communication apparatus is determined based on the at least one first connection right, and
 the plurality of first session parameters comprises a subset of the plurality of second session parameters.

7. The first communication apparatus of claim 1, wherein the storage is further configured to store the at least one second connection right.

8. The first communication apparatus of claim 1, wherein the control circuit is further configured to determine that the at least one second connection right is invalid.

9. The first communication apparatus of claim 8, wherein
 the at least one second connection right is associated with a validity period, and
 the control circuit is further configured to determine that the at least one second connection right is invalid based on expiration of the validity period.

10. An information processing apparatus, comprising:
circuitry configured to:
 establish a first communication session between a first communication apparatus and a second communication apparatus, wherein
  the second communication apparatus is associated with at least one first connection right, and
  the first communication apparatus is different from the information processing apparatus;
 transmit first information that identifies at least one second connection right to the first communication apparatus;
 establish a second communication session associated with the at least one second connection right that differs from the at least one first connection right;
 receive, from the first communication apparatus, a request to synchronize at least a specific portion of data stored in the first communication apparatus with the second communication apparatus, wherein the request indicates the at least the specific portion of the data stored in the first communication apparatus, and the request comprises second information that identifies the second communication apparatus;

transmit, to the first communication apparatus, a response to the received request, wherein the response is generated by the second communication apparatus, the response comprises response data received from the second communication apparatus, the response data corresponds to the at least the specific portion of the stored data, and the first communication apparatus synchronizes the at least the specific portion of the stored data with the response data based on the response;

receive third information, indicative of a successful data synchronization, from the first communication apparatus based on the at least one second connection right; and transmit the third information to the second information processing apparatus.

11. The information processing apparatus of claim 10, wherein the stored data is associated with one of an electronic address book or an electronic calendar.

12. A second communication apparatus, comprising:
a control circuit configured to:
establish, through an information processing apparatus, a communication session with a first communication apparatus, wherein
the communication session is established based on at least one first connection right set in the second communication apparatus,
the first communication apparatus is different from the information processing apparatus,
the at least one first connection right is different from at least one second connection right associated with the first communication apparatus, and
the at least one second connection right is determined based on the at least one first connection right;

transmit first data to the information processing apparatus, wherein
the at least one second connection right is based on the transmitted first data, and
the first communication apparatus includes a storage configured to store second data;

receive, through the information processing apparatus, a request to synchronize a specific portion of the stored second data from the first communication apparatus, wherein
the request indicates the specific portion of the stored second data, and
the request comprises first information that identifies the second communication apparatus;

generate a response to the received request, wherein
the generated response comprises response data corresponding to the at least the specific portion of the stored second data; and transmit, through the information processing apparatus, the generated response to the first communication apparatus, wherein
the first communication apparatus synchronizes the at least the specific portion of the stored second data with the response data, and
the first communication apparatus controls transmission of second information, indicative of a successful data synchronization, based on the at least one second connection right.

* * * * *